United States Patent [19]
Yang et al.

[11] Patent Number: 5,563,664
[45] Date of Patent: Oct. 8, 1996

[54] PRE-FRAME-COMB AS WELL AS PRE-LINE-COMB PARTIAL-RESPONSE FILTERING OF BPSK BURIED IN A TV SIGNAL

[75] Inventors: Jian Yang, Bensalem, Pa.; Allen L. Limberg, Ringoes, N.J.

[73] Assignee: Samsung Electronics Co., Ltd., Kyungki-do, Rep. of Korea

[21] Appl. No.: 179,618

[22] Filed: Jan. 5, 1994

[51] Int. Cl.⁶ .................................................. H04N 7/08
[52] U.S. Cl. ............................................. 348/475; 348/473
[58] Field of Search .................................... 348/473, 475, 348/474, 486, 487, 492, 423, 426, 432, 460, 461, 465, 469; H04N 7/08, 7/04

[56] References Cited

U.S. PATENT DOCUMENTS

| | | | |
|---|---|---|---|
| 5,029,003 | 7/1991 | Jonnalagadda | 348/493 |
| 5,053,860 | 10/1991 | Tsinberg | 348/437 |
| 5,063,446 | 11/1991 | Gibson | 348/484 |
| 5,134,464 | 7/1992 | Basile et al. | 348/487 |
| 5,229,847 | 7/1993 | Gibson | 348/486 |
| 5,287,180 | 2/1994 | White | 348/473 |
| 5,430,487 | 7/1995 | Naimpally | 348/475 |
| 5,448,299 | 9/1995 | Yang et al. | 348/470 |
| 5,461,426 | 10/1995 | Limberg et al. | 348/475 |

OTHER PUBLICATIONS

T. C. Leslie and B. Singh, "An Improved Sigma–Delta Modulator Architecture", *1990 IEEE Symposium on Circuits and Systems*, 90 CH 2868–8900000–0372, pp. 372–375.

*Primary Examiner*—John K. Peng
*Assistant Examiner*—Chris Grant
*Attorney, Agent, or Firm*—Sughrue, Mion, Zinn, Macpeak & Seas

[57] ABSTRACT

BPSK modulation of suppressed carrier in quadrature with a video carrier amplitude-modulated by composite video signal is used for transmitting a serial-bit digital signal, which is subjected both to "pre-line-comb" and "pre-frame-comb" partial-response filtering prior to conversion to BPSK modulating signal. The "pre-frame-comb" partial-response filtering of the serial-bit data is done on a continuous basis, rather than transmitting frames of the BPSK twice, once in positive logic and once in negative logic, during successive pairs of consecutive frames of the NTSC television signal. This results in the full luminance bandwidth below chroma frequencies being available on average for the transmission of BPSK, rather than half that bandwidth.

24 Claims, 13 Drawing Sheets

PRE-FRAME-COMB AS WELL AS PRE-LINE-COMB PARTIAL-RESPONSE FILTERING OF BPSK BURIED IN A TV SIGNAL

The invention relates to receivers for recovering digital signals buried in analog television signals.

BACKGROUND OF THE INVENTION

Relatively small (e.g., 3 to 5 IRE) signals encoding digital information can be admixed together with composite video signals without being readily evident in television pictures generated from those composite video signals if suitable restrictions on the digital signal format are observed. A representative system for doing this is described by Jian Yang in his U.S. patent application Ser. No. 08/141,070, filed Oct. 26, 1993, entitled APPARATUS FOR PROCESSING NTSC TV SIGNALS HAVING DIGITAL SIGNALS ON QUADRATURE-PHASE VIDEO CARRIER and incorporated herein by reference. Yang describes binary phase-shift-keyed (BPSK) modulation of a suppressed carrier that is the same frequency as a video carrier and is in quadrature phasing therewith. Yang advocates the BPSK signals being constrained to about 2 MHz bandwidth so as to avoid crosstalk into chroma in TV receivers that separate chroma from luma without recourse to comb filtering. Yang indicates a preference for passing the data to be transmitted through a partial-response filter for increasing its correlation at corresponding points along successive horizontal scan lines in the composite video signal, this providing a basis for using line-comb filtering in the digital signal receiver to separate PSK subcarrier from the luminance portion of the composite video signal. Yang also advocates repeating frames of the BPSK in antiphase in successive pairs of consecutive frames of the NTSC television signal. Such repetition of data in pairs of frames makes the BPSK accompanying the composite video signal detected from the NTSC television signal less apparent in images that are generated from the composite video signal for viewing on a screen. Such repetition of data in pairs of frames also provides a basis for using frame-comb filtering in the digital signal receiver to separate the BPSK from the luminance portion of the composite video signal that describes static portions of successive television images.

Receivers for the Yang system are also described by Thomas Vincent Bolger in his U.S. patent application Ser. No. 08/141,071, filed Oct. 26, 1993, entitled RECEIVER WITH OVERSAMPLING ANALOG-TO-DIGITAL CONVERSION FOR DIGITAL SIGNALS WITHIN TV SIGNALS and incorporated herein by reference. These receivers digitize the response of a quadrature-phase video detector using an oversampling analog-to-digital converter. The digitized quadrature-phase video detector response is subjected to digital frame-comb and line-comb filtering to suppress remnant composite video signals; the comb filtering response is supplied to multi-level decision circuitry to recover bit-serial digital data transmitted by the BPSK; and the bit-serial digital data is supplied to a decoder that corrects the digital information in the data using forward-error-correcting codes contained therein. The inventions described by J. Yang and T. V. Bolger in their patent applications, like the inventions described herein, are assigned to Samsung Electronics Co., Ltd., pursuant to pre-existing employee agreement so to assign inventions made within the scope of employment.

Constraining the BPSK signals to about 2 MHz bandwidth, so as to avoid crosstalk into chroma in TV receivers that separate chroma from luma without recourse to comb filtering, reduces the average uncorrected data rate to about 2 megabits per second in the preferred Yang system. Average uncorrected data rate is lowered in the preferred Yang system because frames of the BPSK are transmitted once in positive logic and once in negative logic, in successive pairs of consecutive frames of the NTSC television signal. Certain data requires more than this 1 MHz average bandwidth. Stereophonic digital audio of "compact disk quality" requires about twice this bandwidth, by way of example.

By simply modifying the preferred Yang system, so as not to transmit each successive new frame of the BPSK twice, the average uncorrected data rate can be doubled. With regard to video transmission and reception, this simple modification requires sacrificing the frame-averaging effect associated with lags in the responses of the kinescope phosphors and the retinal system of a human viewer that suppress the frame-rate flicker perceived by that human. With regard to data transmission and reception, this simple modification requires sacrificing the advantage of being able to use highpass frame-comb filtering to suppress the portions of the luminance signal which accompanies the BPSK that change between adjacent lines but not from frame to frame. These portions of the luminance signal jam the proper detection of the BPSK from time to time and cause errors in the detected BPSK signal.

Two different types of partial-response filtering are of interest in regard to the inventions disclosed in this specification and its drawing. A partial-response filter that will be referred to as a "pre-line-comb" partial-response filter is composed of one or more sections, each of which sections includes a respective two-input exclusive-OR (XOR) gate having a first input for receiving serial-bit data for partial-response filtering and an output from which section response is taken. Each section further includes a "1-H" digital delay line for applying the section response, as delayed by "1-H" which is the duration of one horizontal scan line in an NTSC television signal, to the second input of the XOR gate in that section. A partial-response filter that will be referred to as a "pre-frame-comb" partial-response filter is composed of one or more sections, each of which sections includes a respective two-input exclusive-OR (XOR) gate having a first input for receiving serial-bit data for partial-response filtering and an output from which section response is taken. Each section further includes a "1-F" digital delay line for applying the section response, as delayed by "1-F" which is the duration of one frame of NTSC television signal, to the second input of the XOR gate in that section. Digital delay lines as used in these filters are commonly constructed using random-access memories (RAMs) arranged for operation in a read-then-write-over mode while being addressed by an address counter counting the number of samples per line in the case of a "1-H" digital delay line or counting the number of samples per frame in the case of a "1-F" digital delay line.

In the Yang system "pre-line-comb" partial-response filtering of the serial-bit data is done at the BPSK digital signal transmitter to complement line-comb filtering done at the digital signal receiver, and in a modification of the Yang system made in accordance with one embodiment of the invention disclosed herein this "pre-line-comb" partial-response filtering is retained. It is augmented by further "pre-frame-comb" partial-response filtering of the serial-bit data being done at the BPSK digital signal transmitter to complement frame-comb filtering done at the digital signal receiver. This frame-comb filtering can comprise highpass frame-comb filtering to suppress the portions of the luminance signal which accompanies the BPSK that change between adjacent lines but not from frame to frame. This highpass frame-comb filtering will provide a somewhat different result because data frames are not transmitted twice during each of successive pairs of consecutive frames of the NTSC television signal, once in positive logic and once in negative logic. The frame-comb filter response will have more signal levels to be separated from each other by the symbol decision circuitry.

Performing "pre-frame-comb" partial-response filtering of the serial-bit data on a continuous basis, rather than transmitting frames of the BPSK twice, theoretically results in the full baseband below chroma being available on average for the transmission of BPSK, rather than half that bandwidth. At the same time there is no need to sacrifice selectivity against the portions of the luminance signal which accompanies the BPSK that change between adjacent lines but not from frame to frame. So, the jamming capability of the video signal remnants to interfere with BPSK detection is reduced.

In the practical world "pre-frame-comb" partial-response filtering of the serial-bit data cannot be carried out on an altogether continuous basis. This is because the data stored in the frame store of the "pre-frame-comb" partial-response filter in the digital signal transmitter and the data stored in the frame store of the "pre-frame-comb" filter of in the digital signal receiver must be synchronized from time to time. Synchronization is implemented in accordance with an aspect of the invention by discarding the contents of both frame stores at the beginnings of recurrent start frames, during each of which start frames a known null pattern is transmitted. This null pattern can be composed of consecutive 1-H intervals of alternated ZEROs and ONEs, with the bit pattern reversed from each 1-H interval to the next, by way of example. Synchronization could be done every eighth frame in response to the ghost cancellation reference signal accompanying the NTSC television signal being in a particular one of the states it cyclically assumes every eighth frame. Synchronizing the digital signal transmitter and receiver every eight frame reduces average data rate by 12.5% from that theoretically achievable. Synchronization is done primarily to accommodate the tuner of the digital signal receiver changing between channels transmitting digital data, however. So synchronization need be done only frequently enough that a person doing the channel switching can ascertain within a reasonably short time whether or not he has tuned to a channel he desires to be received. Synchronization every sixty-fourth frame is probably frequent enough, which reduces average data rate about 1.5% from that theoretically achievable. Alternatively, synchronization every thirty-second frame reduces average data rate about 3% from that theoretically achievable.

SUMMARY OF THE INVENTION

Serial-bit digital data is both pre-frame-comb partial-response filtered and pre-line-comb partial-response filtered prior to conversion to BPSK that is transmitted together with video, without each successive new frame of the BPSK being twice transmitted, in a digital signal transmitter that is a preferred embodiment of the invention in regard to digital signal transmitters that share transmission channels with NTSC television transmitters.

In a digital signal receiver that is a preferred embodiment of the invention in regard to digital signal receivers, this transmission procedure implements both highpass frame-comb filtering and highpass line-comb filtering of digital signal being done to suppress accompanying luma. Reduction of the luma accompanying the digital signal permits its detection with lower bit error rate (BER) in the digital signal receiver.

Figure 6:
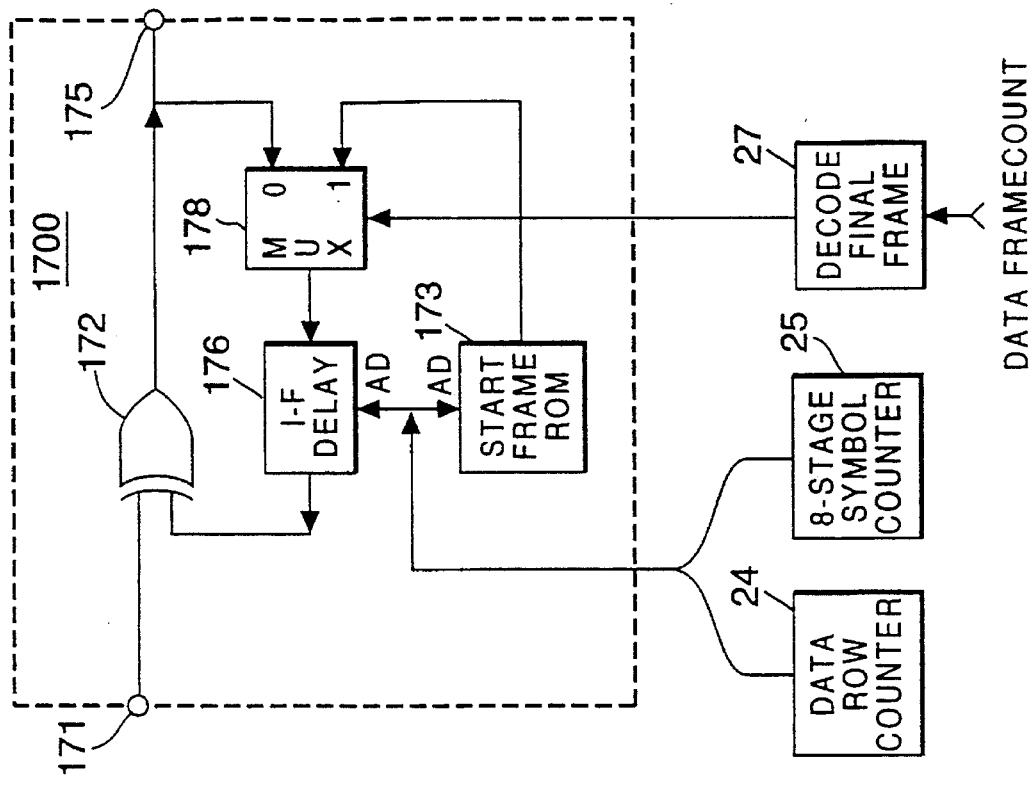
Figure 5:
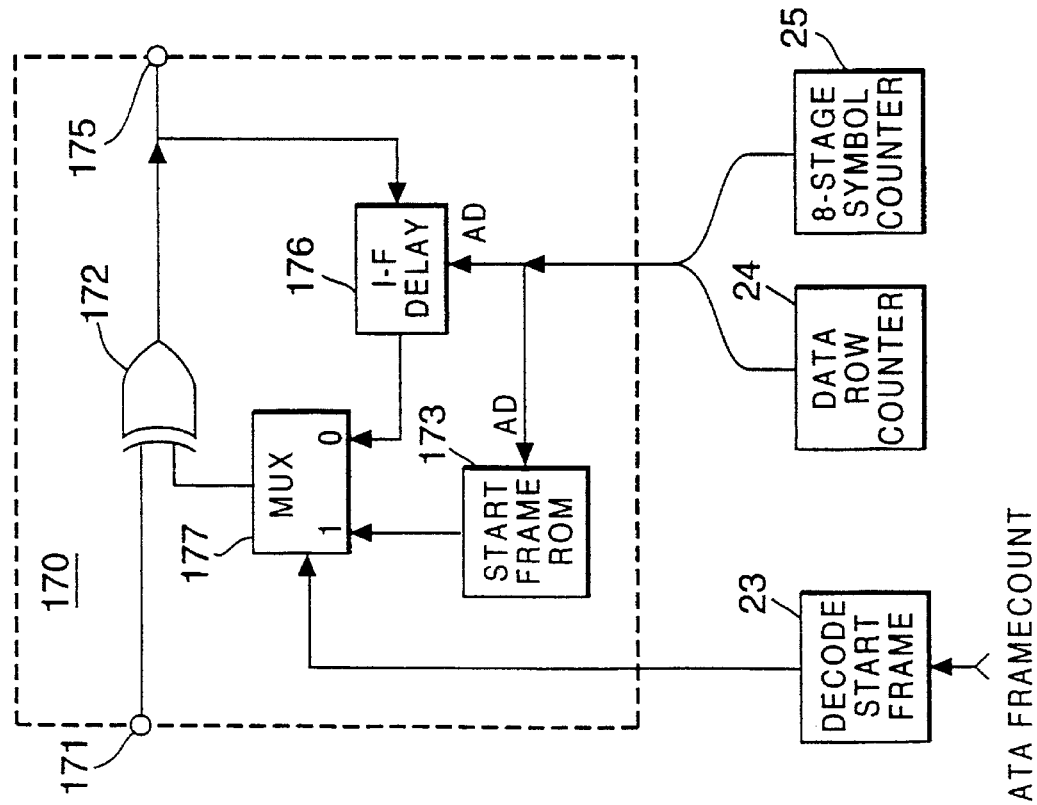

Each of FIGS. 5 and 6 is a schematic diagram of an alternative structure for the pre-frame-comb partial-response filter.

Figure 7:
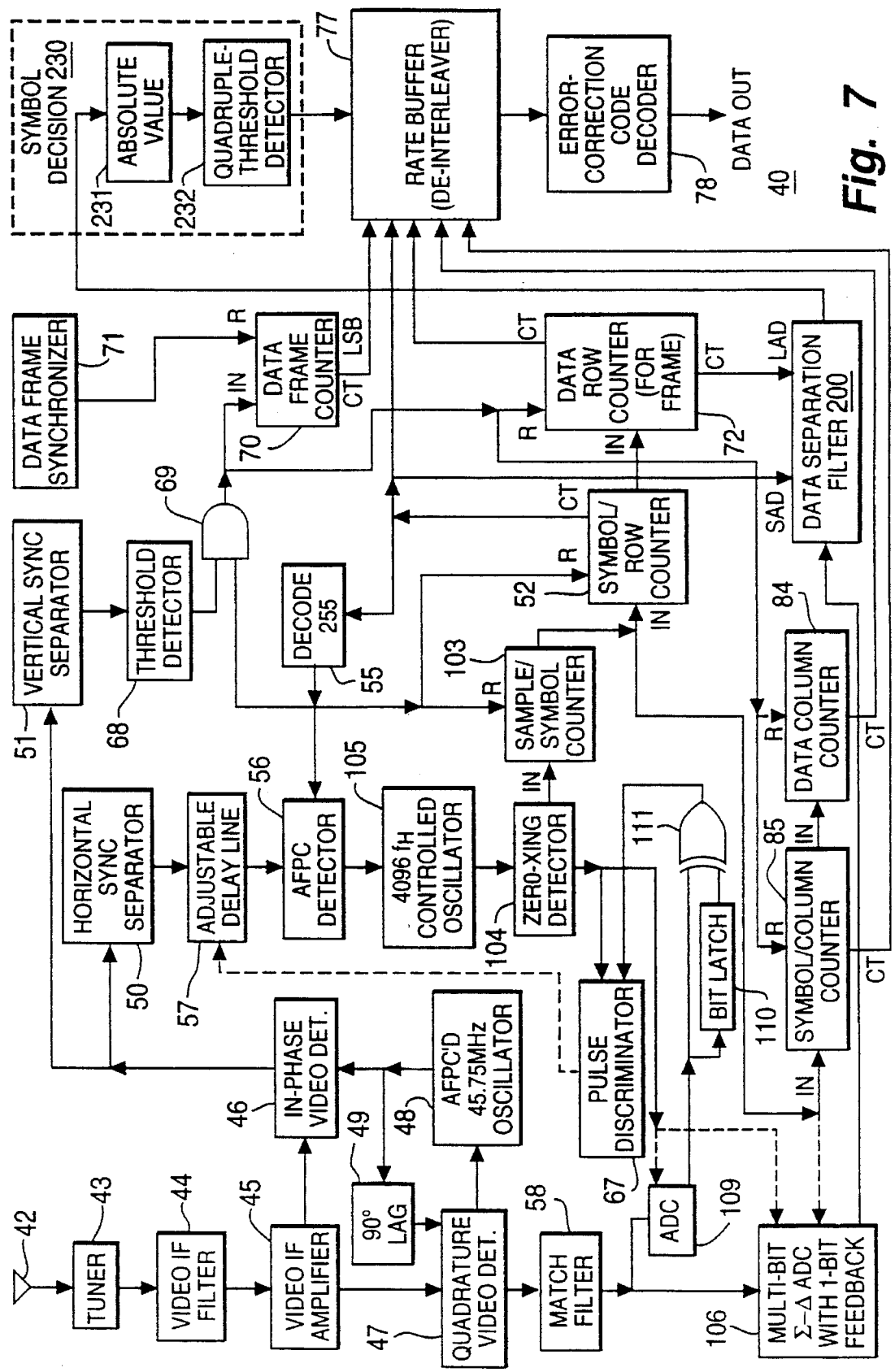

FIG. 7 is a schematic diagram of a respective digital-signal receiver constructed in accordance with the invention for receiving a television signal with a digital signal buried therewithin and extracting the buried digital signal.

Each of FIGS. 8, 9, 10 and 11 is a schematic diagram of an alternative structure for a data separation filter in the FIG. 7 digital-signal receiver.

Figure 3:
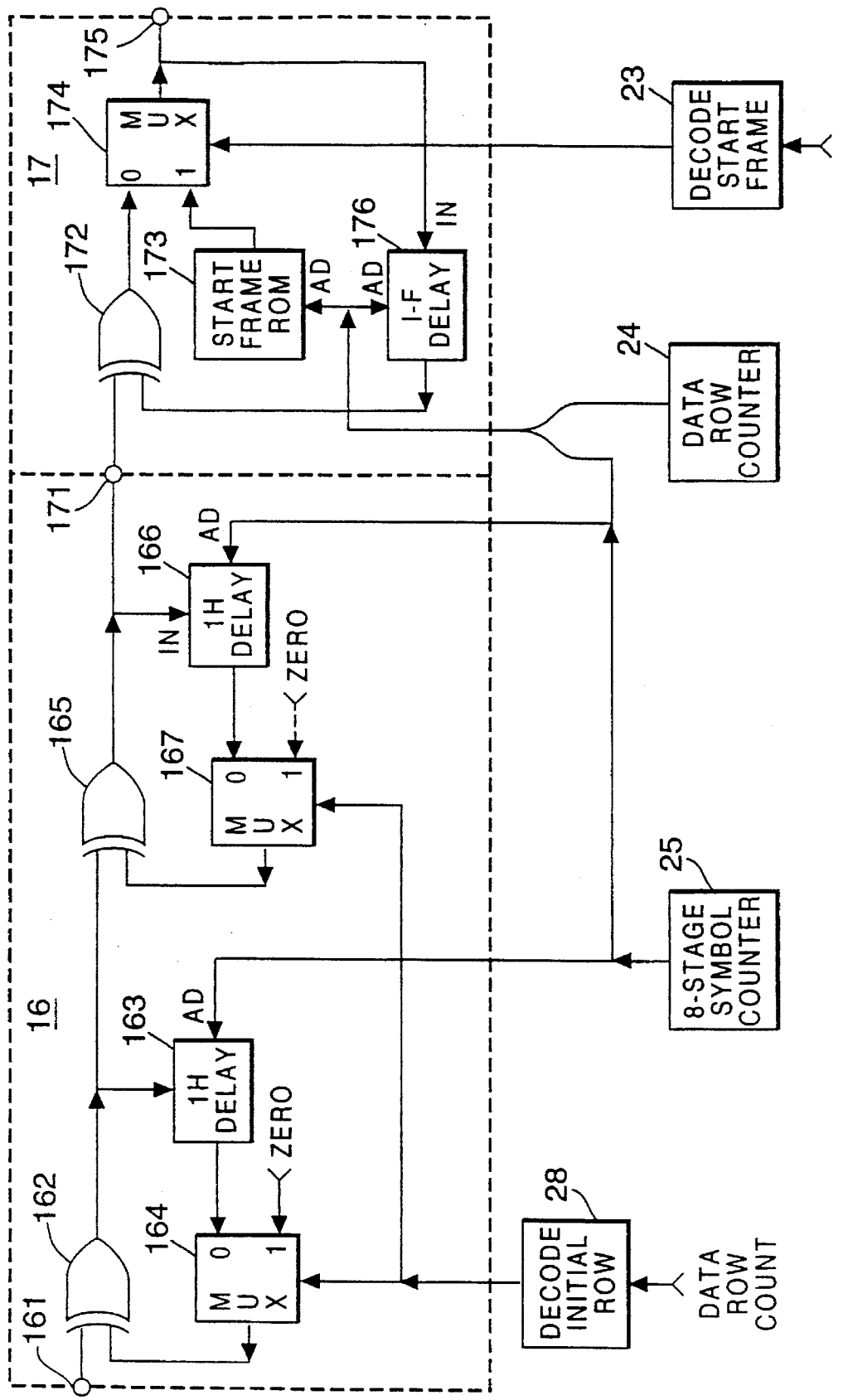
FIG. 3 is a schematic diagram showing in detail a representative construction of the cascaded pre-line-comb and pre-frame-comb partial-response filters used in the FIG. 1 television transmitter.
Figure 10:
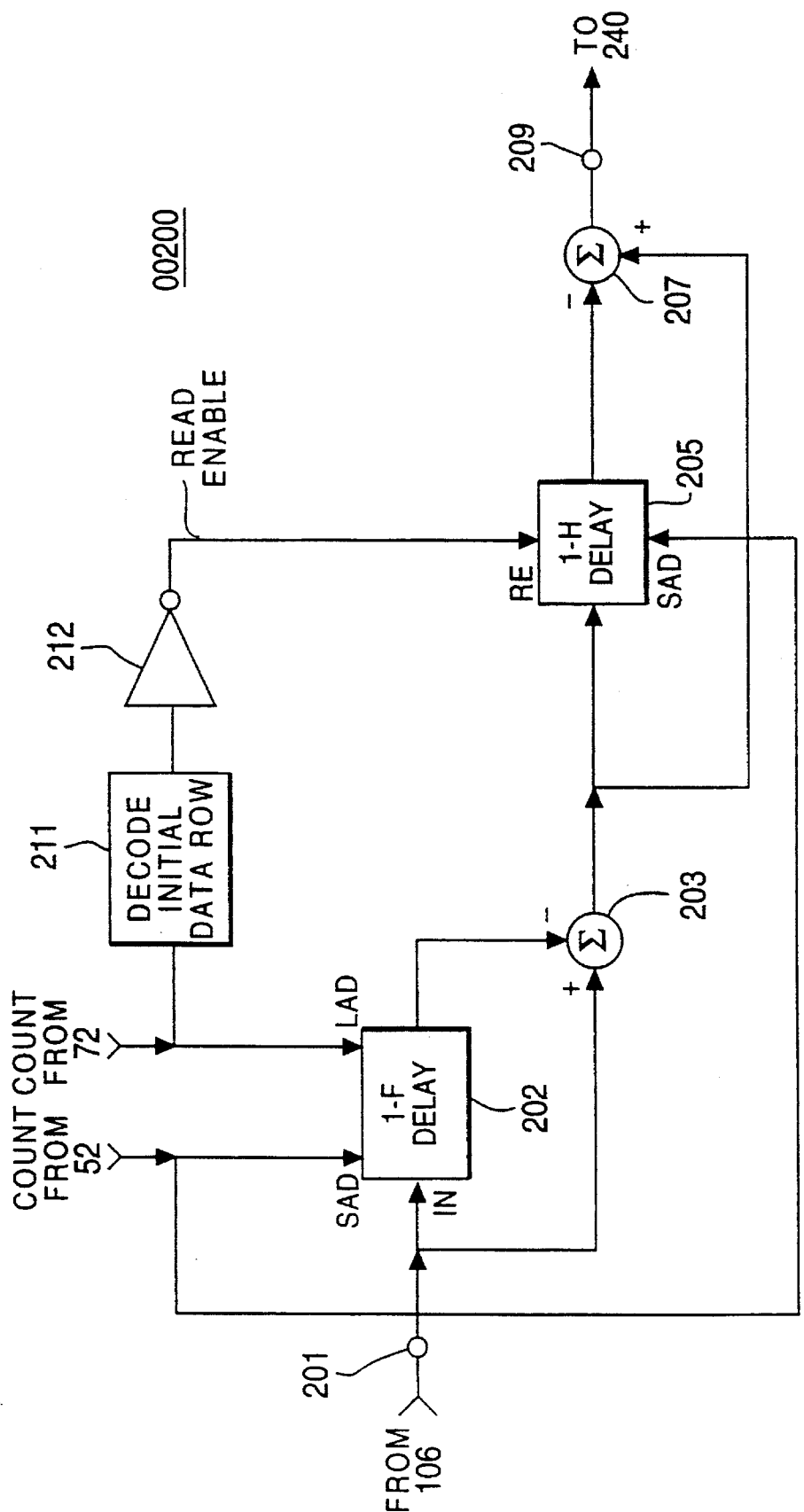
Figure 11:
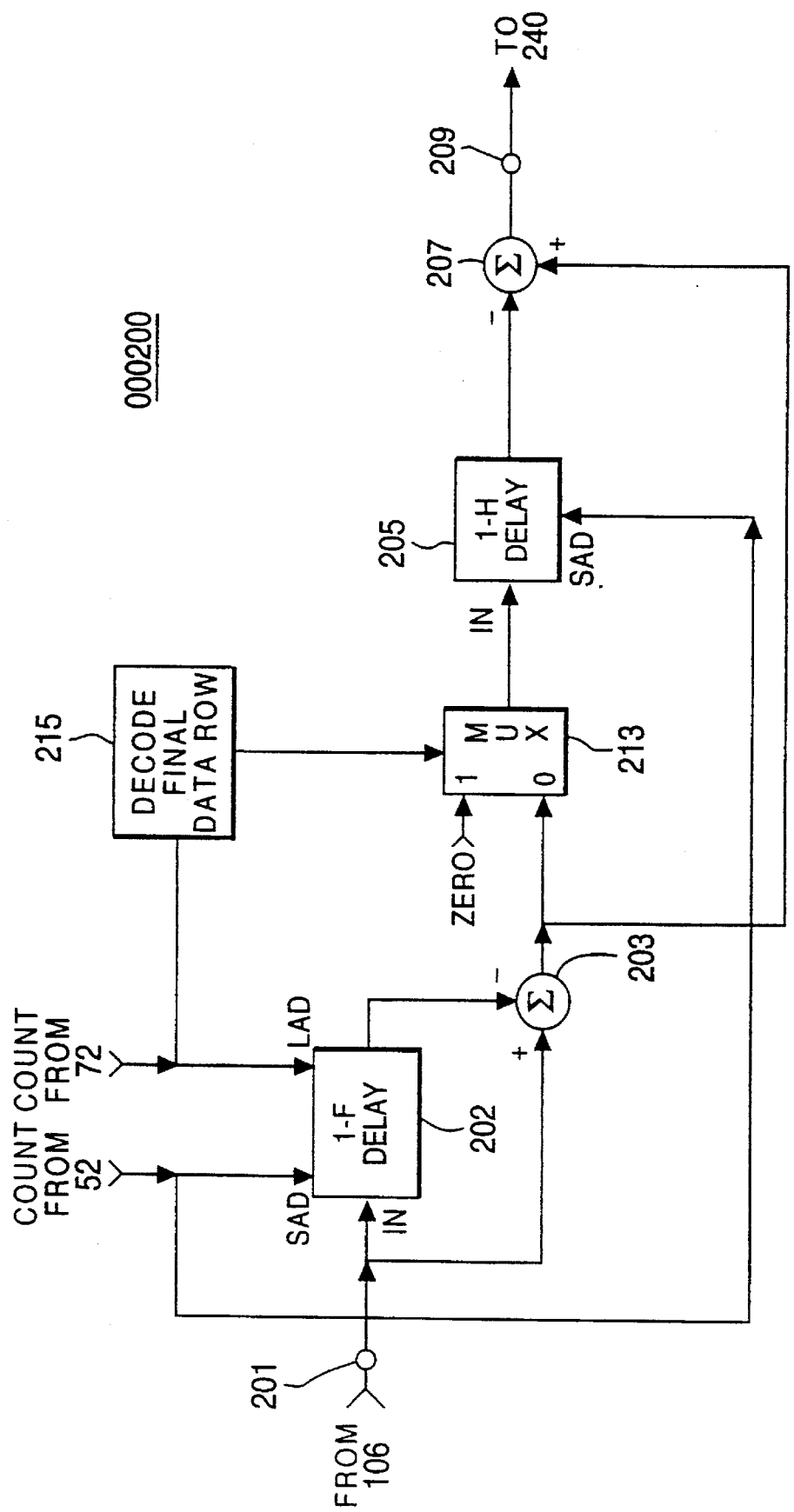
Figure 12:
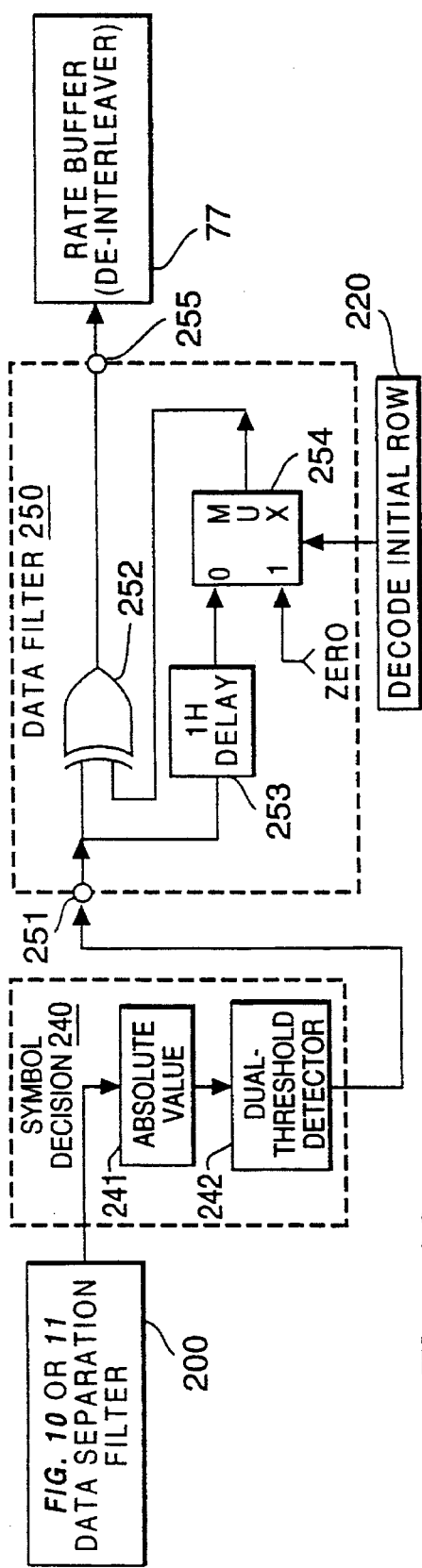
Figure 13:
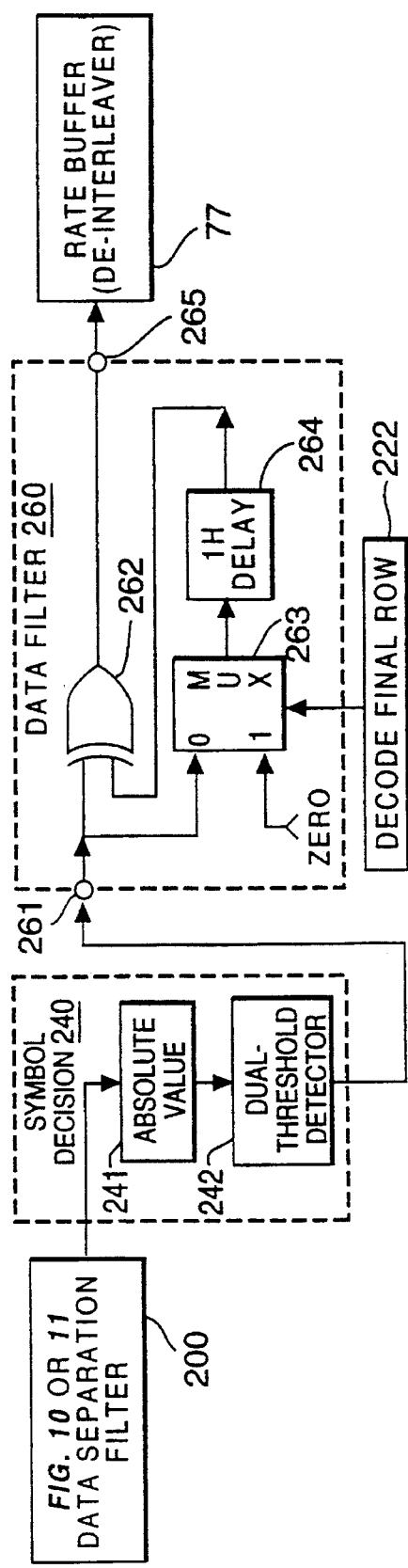

FIGS. 12 and 13 are schematic diagrams of alternative logic circuits each of which permits the data separation filters of FIGS. 10 and 11 to be used with the FIG. 3 partial-response filtering.

Figure 14:
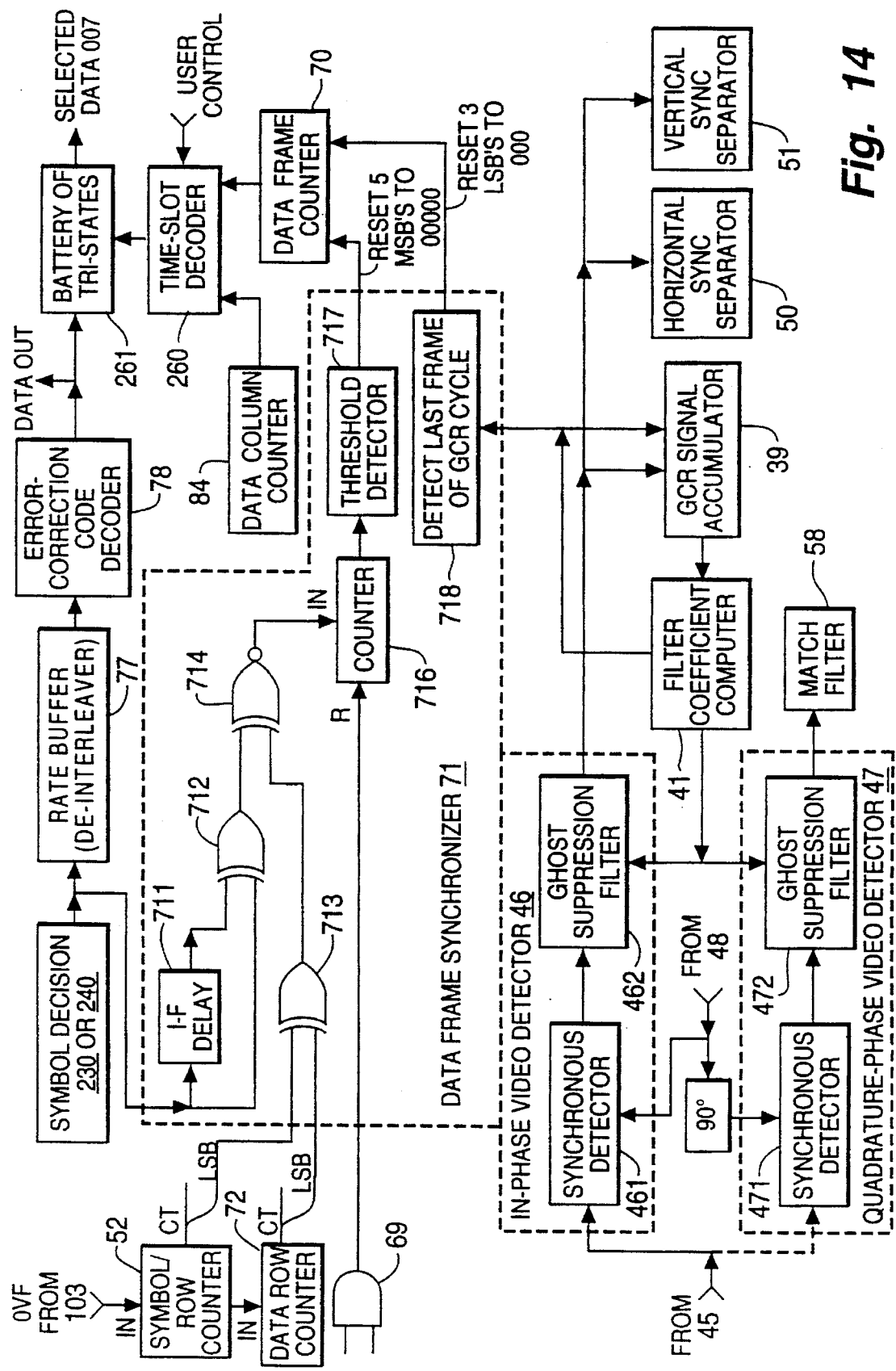

FIG. 14 is a schematic diagram of reset circuitry for the data frame counter of the FIG. 7 digital-signal receiver.

Figure 15:
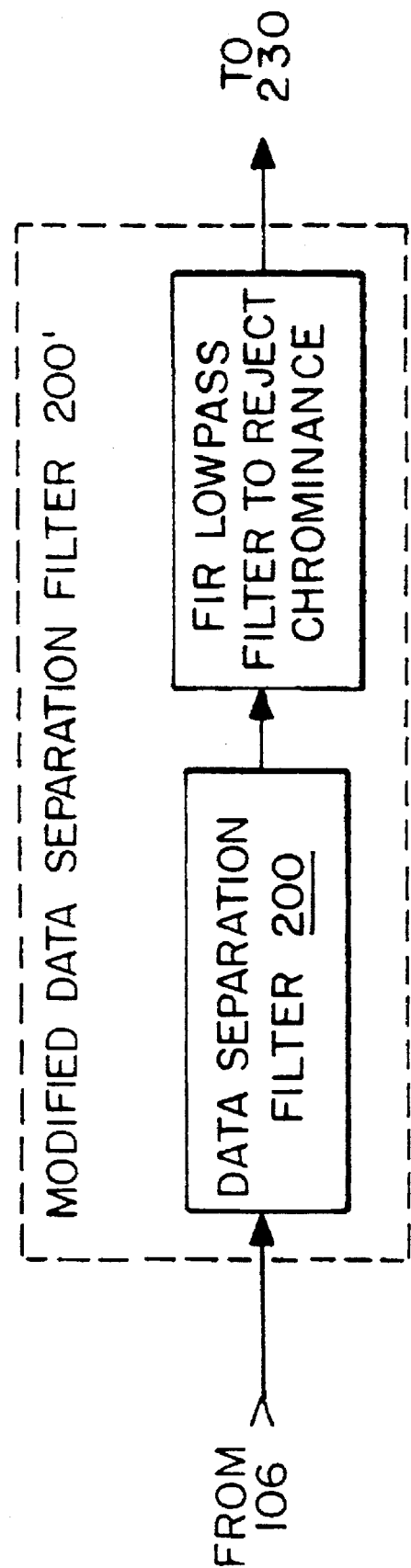

FIG. 15 is a schematic diagram showing a modification of the FIG. 7 digital-signal receiver in which a finite-impulse-response digital lowpass filter for suppressing chrominance signal is included in the data separation filter.

DETAILED DESCRIPTION

Generally, equalizing delays have been omitted from the drawing figures to simplify them and to make them easier to understand. One skilled in the art of video signal processor design will appreciate the need for such delays to properly time-align pixels or data subject to different delays on different processing paths due to the differing processing performed in those paths. One skilled in the art would understand where such delays would be necessary and how long each of the delays would have to be, and such delays will not be described or discussed below. In logic circuitry, one skilled in the art would understand how to provide the shimming delays required to overcome undesired "logic race" conditions or to compensate for latent delays in performing logic operations; and details of logic circuitry design with regard to providing shimming delay will not be discussed below. Further, where an analog-to-digital converter (ADC) is shown or described in the present disclosure, one skilled in the art would understand the desirability of preceding such converter with an anti-aliasing lowpass filter, and how this could be implemented, and such will not be further described in detail below. Also, where a digital-to-analog converter (DAC) is shown or described in the present disclosure, one skilled in the art would understand the desirability of following such converter with a sampling clock rejection lowpass filter, and how this could be implemented, and such will not be further described in detail below.

Figure 1:
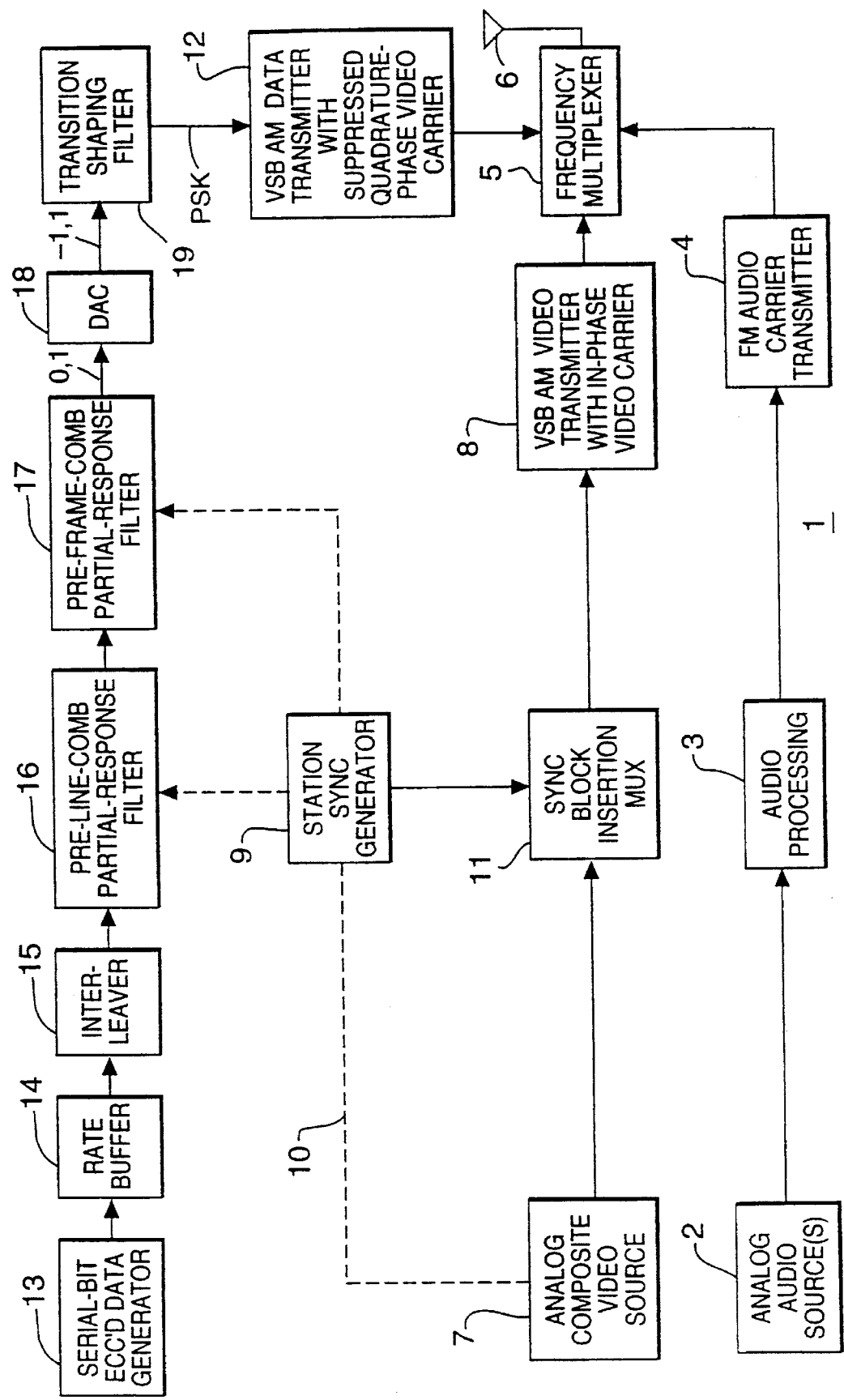
FIG. 1 is an overall schematic diagram of a television transmitter for transmitting a television signal with a digital signal buried therewithin in accordance with aspects of the invention.

FIG. 1 shows a television transmitter 1 for transmitting a television signal with a digital signal buried therewithin. A source 2 supplies one or more analog audio signals to audio processing circuitry 3 which supplies a modulating signal to an audio carrier transmitter 4 for modulating the frequency of the audio carrier wave. The audio processing circuitry 3 includes delay as needed for synchronizing sound and picture. The audio processing circuitry 3, in accordance with customary practice, also includes pre-emphasis networks for the analog audio signal(s) and may include apparatus for generating stereophonic and secondary audio program (SAP) subcarriers for inclusion in the modulating signal supplied to the audio carrier transmitter 4. The frequency-modulated (FM) audio carrier is typically supplied from the transmitter 4 to a multiplexer 5 to be frequency-multiplexed with in-phase VSB AM picture carrier and quadrature-phase VSB BPSK data carrier. In a television transmitter 1 for over-the-air broadcasting, this multiplexer 5 typically takes the form of an antenna coupling network and the resulting frequency-multiplexed signal is broadcast from a transmitting antenna 6. A television transmitter for the head end of a cable broadcasting system will not have the transmitting antenna 6 used in over-the-air broadcasting. The multiplexer 5 will take different form, with the frequency-multiplexed signal from the channel under consideration being further frequency-multiplexed with the frequency-multiplexed signals from other channels, and with the resulting signal being applied by linear amplifiers to the trunk cables of the cable broadcasting system.

In FIG. 1 a source 7 supplies an analog composite video signal that is the basis for the modulating signal supplied to a transmitter 8 that in turn supplies the VSB AM picture carrier to the multiplexer 5, there to be frequency-multiplexed with the frequency-modulated (FM) sound carrier. The vertical synchronizing pulses, horizontal synchronizing pulses and color burst of analog composite video signal from the source 7 are synchronized with corresponding signals supplied by a station synchronizing signal generator 9. A control connection 10 between the source 7 of composite video signal and the station sync generator 9 symbolizes the means used for this synchronization. Where the source 7 is a remote generator of composite video signal, such as a downtown studio or another television station networked with the local television station, the control connection 10 may be a genlock connection to the station sync generator 9. Where the source 7 is a local camera, that local camera may receive synchronization information from the station sync generator 9 via the control connection 10. These and other synchronizing schemes including those for video tape recorders and telecine apparatus are familiar to those skilled in the art. Typically, a time-division multiplexer 11 is used to insert sync block information including vertical synchronizing pulses, horizontal synchronizing pulses, equalizing pulses, color burst and pedestals (commonly referred to as "porches") into the composite video signal applied as modulating signal to the picture carrier transmitter 8 in place of original sync block information.

The FIG. 1 television transmitter 1 differs from those currently used in that a further VSB AM transmitter 12 generates a vestigial-sideband, binary phase-shift-keyed (VSB BPSK) suppressed carrier in quadrature phasing with the VSB AM video carrier for NTSC composite video signal. This further VSB AM transmitter 12 can include a balanced modulator, balanced both against carrier and against BPSK modulating signal, and can further include a 90°-phase-shift network receiving in-phase video carrier from the VSB AM transmitter 8 and supplying quadrature-phase video carrier to the balanced modulator. The VSB BPSK signal from the transmitter 12, like the VSB AM video carrier amplitude-modulated by NTSC composite video signal from the transmitter 8, is supplied to the multiplexer 5, there also to be frequency-multiplexed with the frequency-modulated (FM) sound carrier. A generator 13 supplies in serial-bit form a digital signal that has been error-correction coded (ECC'd) in accordance with a forward error-correction code, the error correction coding preferably being done using modified Reed Solomon coding of the digital signal while in a parallel-bit format, at a time prior to conversion of the error-corrected data to serial-bit format. The serial-bit digital signal generated by the generator 13 is supplied to a rate buffer 14 that compacts the data so it does not fall within the regularly recurring start frames in its output signal, which start frames are made to consist of ZEROs. The output signal from the rate buffer 14 is supplied to an interleaver 15 as consecutive columns of bits within data frames, which the interleaver 15 converts into consecutive rows of bits within data frames. The resulting serial-bit stream is applied to a pre-line-comb partial-response filter 16. The pre-line-comb partial-response filter 16 supplies its digital response to a pre-frame-comb partial-response filter 17. The digital response from the pre-frame-comb partial-response filter 17 is supplied to a digital-to-analog converter (DAC) 18, for conversion to an analog keying signal. The DAC 18 supplies a high-frequency pre-emphasis and transition-shaping filter 19 with keying signal that is of a prescribed positive value responsive to a digital ZERO and is of a prescribed negative value responsive to a digital ONE. The prescribed negative level of analog modulating signal has the same absolute value as the prescribed positive level of analog modulating signal. The filter 19 compensates for the loss in detection efficiency when synchronously detecting the VSB BPSK, which loss is attributable to transmission being only single sideband in nature over part of the digital signal band. The response of the filter 19 is a keying signal supplied to a balanced modulator in the transmitter 12, which balanced modulator also receives a quadrature-phase video carrier wave to be modulated. The transmitter 8 that supplies the VSB AM video carrier amplitude-modulated by NTSC composite video signal to the multiplexer 5 is carefully designed and operated so as to avoid incidental phase modulation that might interfere with the quadrature-phase VSB BPSK suppressed carrier from the transmitter 12. Since the quadrature-phase VSB AM carrier for PSK is suppressed, the phasing of the signal in which the VSB PSK and VSB AM carriers are combined is not appreciably different from that of the in-phase VSB AM video carrier.

FIG. 1 shows the pre-line-comb partial-response filter 16 preceding the pre-frame-comb partial-response filter 17 in their cascade connection with each other. The reason this is preferred is that in the digital signal receiver it is preferred to do frame-comb filtering before line-comb filtering and luma/chroma band selection filtering for separating digital signal from interfering remnants of the NTSC composite video signal. Doing frame-comb filtering first in the digital receiver permits a single frame-store to be used in both the lowpass frame-comb filtering used to suppress chroma and the highpass frame-comb filtering used to suppress luma. If lowpass and highpass frame-comb filtering were done after line-comb filtering or after luma/chroma band selection filtering, separate frame stores would be required for lowpass and highpass frame-comb filtering. The resetting procedures for the partial-response filters in the digital signal transmitter and in the digital signal receiver require that the order in which partial-response filtering is done in the digital signal transmitter is opposite the order in which partial-response filtering is done in the digital signal receiver. Digital signal transmitters and digital signal receivers that differ from the preferred embodiments described in this specification and shown in its drawing are considered to be alternative, non-preferred embodiments of the invention.

While FIG. 1 shows the transmitters 8 and 12 as being separate from each other, in practice the same upper sideband filters and final amplifier stages can be shared by the transmitters 8 and 12.

Figure 2:
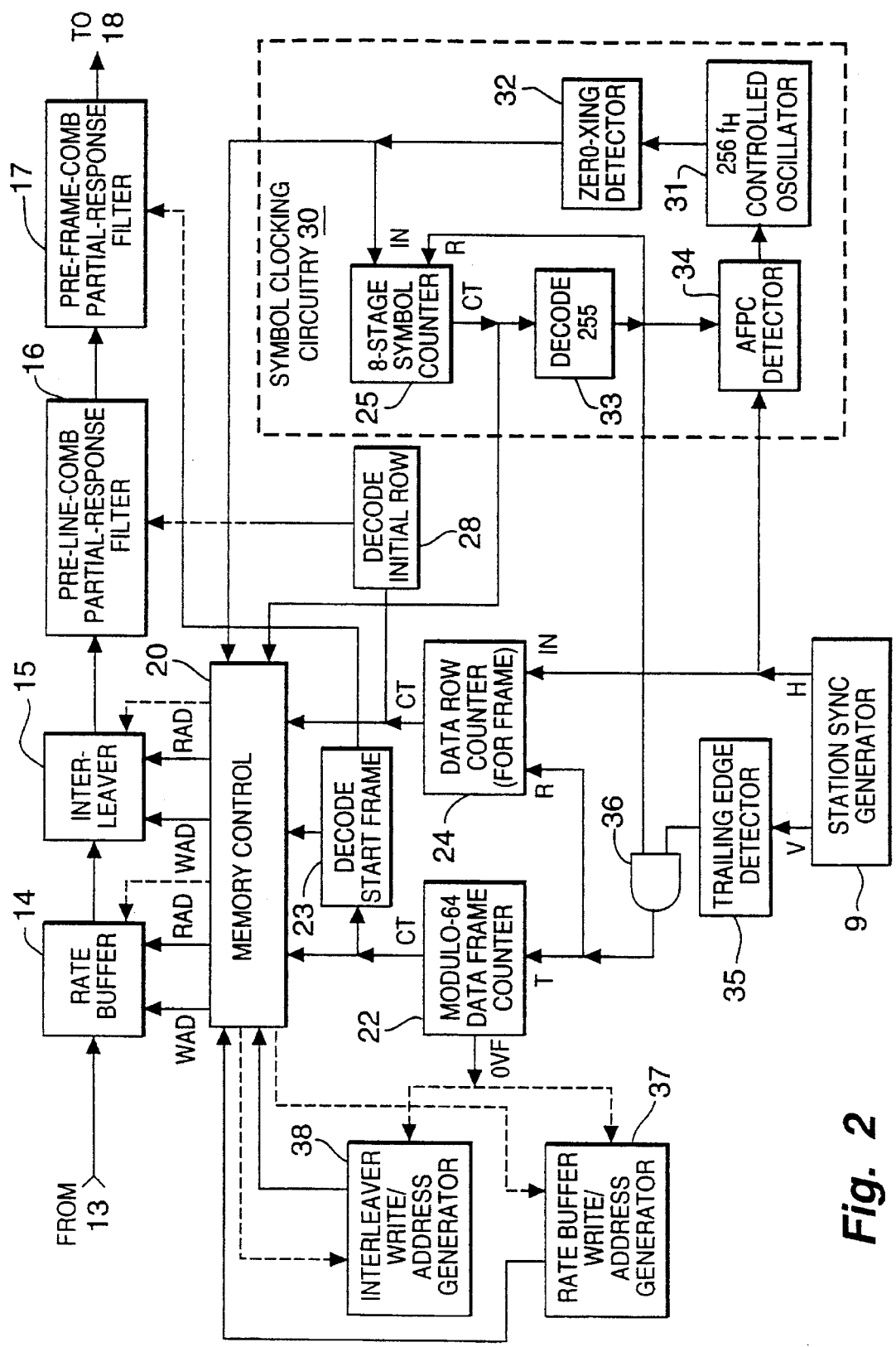
FIG. 2 is a schematic diagram showing in detail a portion of the FIG. 1 television transmitter used for digitally filtering the digital data from which the phase-shift keying signal is to be generated, which phase-shift keying signal modulates the suppressed, quadrature-phase video carrier.

FIG. 2 shows in more detail the construction of the portion of the FIG. 1 TV transmitter 1 used for digitally filtering the digital data from which the phase-shift keying signal is to be generated. Error-correction-coded digital signal in serial-bit form is supplied to the rate buffer 14, which packs the digital signal so that it does not occupy the start frames. The rate buffer 14 can supply null samples at random during the start frames, if (as in FIG. 3) the pre-frame-comb partial-response filtering is configured to permit this. If (as in FIG. 4 or 5) the pre-frame-comb partial-response filtering is not configured to permit this, ZEROs are used as null samples in the start frames, being inserted by the rate buffer 14 or the ensuing interleaver 15.

Interleaver 15 responds to the original order of the scanning of data in columns, to rearrange the data in rows of data transverse to the columns of data, response to which rows of data is ultimately transmitted by the VSB BPSK data transmitter 12 simultaneously with respective horizontal scan lines of the composite video signal being transmitted by the VSB AM video transmitter 8. This is done so impulse noise and midband frequencies of composite video signal, which tend to have coherence in the horizontal direction, jam fewer bits of the codes than would be the case with codes operating on data mapped into rows along horizontal scan lines, rather than on data mapped into columns transverse to horizontal scan lines. Presuming the codes to be forward error-correcting codes, the permits the fraction of the bits needed for achieving parity in the forward error-correction calculations to be reduced for any specified noise burst immunity.

Data frames are defined as blocks of 525 rows of symbols which occur at a symbol rate that is a multiple of data row scan rate, which data row scan rate is the same as the horizontal scan line rate for analog composite video signal. BPSK symbols are bits, but the symbols to which the forward error-correcting codes (such as modified Reed-Solomon codes) are applied are customarily $2^N$-bit data, N being a small positive integer such as three, four or five. The bit length over which each of the forward error-correcting codes is chosen to be less than 525, so that impulse noise is less likely to disrupt any one of the forward error-correcting codes more than once along its length. The relative phasing of the data rows and the horizontal scan lines of composite video signal is such that each data row coincides in time with a respective horizontal scan line of composite video signal. Data frames occur at the same rate as the frames of the analog composite video signal supplied by the source 7, but it is convenient to have the data frames lag the video signal frames by nine horizontal scan lines of composite video signal.

Operations of the rate buffer 14 and the interleaver 15 are controlled by a memory controller 20. The writing of the rate buffer 14 is done in accordance with rate-buffer write addresses generated by a rate-buffer write address generator 37. The reading of the rate buffer 14 and the writing of the interleaver 15 are done in accordance with interleaver write addresses generated by an interleaver write address generator 38. FIG. 2 does not show the details of the address generators 37 and 38 since they are incidental to the inventions, but each includes a respective multiple-stage address counter for counting pulses from a respective clocking source.

A data frame counter 22 counts the data frames, rolling over to the count of arithmetic one at the beginning of each start frame and issuing an overflow pulse that resets the address counters in the write address generators 37 and 38. Incidentally, the three least significant bits of the data frame counter 22 can be used for counting eight-frame cycles for controlling the insertion of ghost-canceling reference signals into the composite video signals during selected vertical-blanking interval (VBI) scan lines. A decoder 23 decodes the DATA FRAME COUNT supplied by the data frame counter 22 being arithmetic one throughout each start frame, to furnish a logic ONE to the pre-frame-comb partial-response filter 17 for purposes of frame-store synchronization.

FIG. 2 shows in some detail the circuitry for generating the less significant bits of the read addresses the memory controller 20 applies to the interleaver 15. The memory controller 20 receives a DATA ROW COUNT signal from a data row counter 24 and a SYMBOL COUNT signal from a symbol counter 25, which the memory controller 20 applies as row addressing and as within-row read addressing, respectively, to each of two frame stores included in the interleaver 15 and alternately written and read in respective orders, staggered in time with respect to each other. The memory controller 20 controls the alternate writing and reading of the two frame stores included in the interleaver 15 responsive to the least significant bit of the DATA FRAME COUNT from the counter 22. An initial row decoder 28 is supplied DATA ROW COUNT signal from the data row counter 24 and throughout the initial data row in each data frame furnishes a logic ONE to the pre-line-comb partial-response filter 16 for purposes of line-store synchronization.

FIG. 2 shows symbol clocking circuitry 30 that includes, in addition to the symbol counter 25, a voltage-controlled oscillator (VCO) 31, a zero-crossing detector 32, a 255-count decoder 33 and an automatic frequency and phase control (AFPC) detector 34. The symbol counter 25 comprises eight binary counting stages. The zero-crossing detector 32, which might be more properly termed an average-axis-crossing detector, generates a pulse whenever the sinusoidal oscillations of the oscillator 30 cross their average axis in a prescribed direction. The zero-crossing detector 32 customarily comprises a limiter amplifier that generates square waves responsive to the sinusoidal oscillations of the VCO 31, a differentiator for generating pulses responsive to transitions of these square waves, and a clipper for separating pulses of one polarity to be supplied to the memory controller 20 for timing purposes. These pulses are also supplied to the symbol counter 25 to be counted in each consecutive line, thereby to generate the SYMBOL COUNT signal supplied to the memory controller 20. The 255-count decoder 33 decodes the SYMBOL COUNT reaching 255 to generate a pulse. Instead of letting the SYMBOL COUNT simply roll over to arithmetic zero because full count is an integral power of two, each pulse from the 255-count decoder 33 can be used to reset the counter 25 on the next pulse supplied to the counter 25 by the zero-crossing detector 32, thus returning SYMBOL COUNT to arithmetic zero. The 255-count decoder 33 supplies pulses to the AFPC detector 34, to be compared with the horizontal sync pulses H to develop an AFPC voltage supplied to the VCO 31. This completes a negative feedback loop that adjusts the frequency of the VCO 31 oscillations to be 256 times the horizontal scan line frequency, or 4,027,972 Hz.

One way of synchronizing counting by the data frame counter 22 and the data row counter 24 with the frames of analog composite video signal will now be considered. In a digital signal receiver for a system as described in this specification, it is preferable to synchronize the counter that regenerates DATA FRAME COUNT to the beginning of line 9 of each frame of the analog composite video signal, just after the trailing edge of the vertical sync pulse in the initial field of such frame. In such case, the counter that generates DATA ROW COUNT in the digital signal receiver is reset to prescribed count value at the beginning of line 9 of each frame of the analog composite video signal. The synchronizing of the counting by the data frame counter 22 and the data row counter 24 in the portion of the transmitter 1 shown in FIG. 2 conforms to the desired receiver practice.

The 255-count decoder 33 output signal is supplied as a first input signal to a two-input AND gate 36. The station sync generator 9 supplies vertical sync pulses V to a trailing edge detector 35, which supplies pulses at the conclusions of lines 9 of composite video signal and at the midpoints of lines 271 of composite video signal output signal is supplied as a second input signal to the AND gate 36. The response of the AND gate 36 consists of DATA-FRAME-END pulses at the conclusions of lines 9 of composite video signal. Each of these DATA-FRAME-END pulses is applied as a trigger pulse to the data frame counter 22, so as to advance the DATA FRAME COUNT signal, and is also applied to the data row counter 24 to reset its DATA ROW COUNT to prescribed initial value. In practice, the 255-count decoder 33 may be dispensed with, and the carry pulses from the final binary counting stage of the symbol counter 25 may be supplied to the AFPC detector 34 and to the AND gate 36 instead of the decoder 33 output signal.

FIG. 3 shows representative constructions of the pre-line-comb and pre-frame-comb partial-response filters 16, 17 used in the FIG. 1 television transmitter 1. Digital input signal in serial-bit form is applied via an input terminal 161 to a first input of a two-input exclusive-OR (XOR) gate 162. The XOR gate 162 has an output connected to the input of a digital delay line 163, which supplies at its output connection a response to the output signal from the XOR gate 162 after "1 H" delay. A second input of the XOR gate 162 receives signal from the output connection of a multiplexer 164, which receives an INITIAL ROW DECODING RESULT from an initial row decoder 28 as a control signal. The initial row decoder 28 receives DATA ROW COUNT from the counter 24 as input signal, responding with a ONE output signal to the value of DATA ROW COUNT indicating the data row to be the initial one of a data frame, and responding with a ZERO output signal to each other value of DATA ROW COUNT. Except when the INITIAL ROW DECODING RESULT supplied as control signal to the multiplexer 164 is ONE, the multiplexer 164 selects the delayed response at the output connection of the digital delay line 163 for application to the second input of the XOR gate 162. When the INITIAL ROW DECODING RESULT supplied as control signal to the multiplexer 164 is ONE, the multiplexer 164 selects a wired logic ZERO for application to the second input of the XOR gate 162. The elements 162, 163 and 164 provide an initial section of the pre-line-comb partial-response filter 16, which filter 16 can further have a final section as shown in FIG. 3.

FIG. 3 shows the pre-line-comb partial-response filter 16 to have a final section including elements 165, 166 and 167. The two-input exclusive-OR gate 165 has a first input to which the output of XOR gate 162 is connected for applying the response of the initial section of the pre-line-comb partial-response filtering. The response of the XOR GATE 165 is applied to the input connection of a digital delay line 166, which supplies at its output connection a response to the output signal from the XOR gate 165 after "1H" delay. A second input of the XOR gate 165 receives signal from the output connection of a multiplexer 167, which receives the INITIAL ROW DECODING RESULT from the initial row decoder 28 as a control signal. Except when the INITIAL ROW DECODING RESULT supplied as control signal to the multiplexer 167 is ONE, the multiplexer 167 selects the delayed response at the output connection of the digital delay line 166 for application to the second input of the XOR gate 165. When the INITIAL ROW DECODING RESULT supplied as control signal to the multiplexer 167 is ONE, the multiplexer 167 selects a wired ZERO for application to the second input of the XOR gate 165.

The response of the final section of the pre-line-comb partial-response filter 16 appears at the output of the XOR gate 165. FIG. 3 shows this response being applied to a terminal 171 that is the input terminal of the pre-frame-comb partial-response filter 17 as well as the output terminal of the pre-line-comb partial-response filter 16. The digital delay lines 163 and 166 can each be a respective random-access memory (RAM) addressed by the SYMBOL PER DATA ROW COUNT from the counter 25 and operated in a read-and-then-write-over mode. Alternatively, a non-preferred embodiment of the pre-line-comb partial-response filter 16 has only one section comprising the elements 162, 163 and 164. In this non-preferred embodiment the elements 165, 166 and 167 are dispensed with; and the response of the filter 16 appearing at the output of the XOR gate 162 is applied to the terminal 171.

FIG. 3 shows the pre-frame-comb partial-response filter 17 as having only one section. The response of the pre-line-comb partial-response filter 16 is applied via the terminal 171 to a first input of a two-input exclusive-OR (XOR) gate 172. A read-only memory (ROM) 173 stores a pattern of bits descriptive of a start frame of data, which is read to a first input of a two-input multiplexer 174, the second input of which multiplexer 174 has the output response of the XOR gate 172 applied thereto. The multiplexer 174 receives a control signal from the decoder 23. When the decoder 23 decodes the DATA FRAME COUNT supplied by the data frame counter 22 being arithmetic one, to furnish a logic ONE throughout each start frame, the multiplexer 174 responds to this condition of its control signal to apply the pattern of bits descriptive of a start frame of data read from the ROM 173 to an output terminal 175 of the filter 17. During data frames other than the start frame, the DATA FRAME COUNT supplied by the data frame counter 22 is other than arithmetic one, so the decoder 23 furnishes a logic ZERO. The multiplexer 174 responds to this condition of its control signal to apply the output response of the XOR gate 172 to the output terminal 175. In either case the response of the pre-frame-comb partial-response filter 17 applied to its output terminal 175 is applied to the second input of the two-input exclusive-OR (XOR) gate 172 with a one-frame (1-F) delay as provided by a digital delay line 176. The digital delay line 176 can be provided by a RAM operated in a read-and-then-write-over mode. This RAM and the ROM 174 storing the start frame data are addressed in parallel by a DATA ROW COUNT supplied from the counter 24 applied as row address and the SYMBOL PER DATA ROW COUNT from the counter 25 applied as column address.

Figure 4:
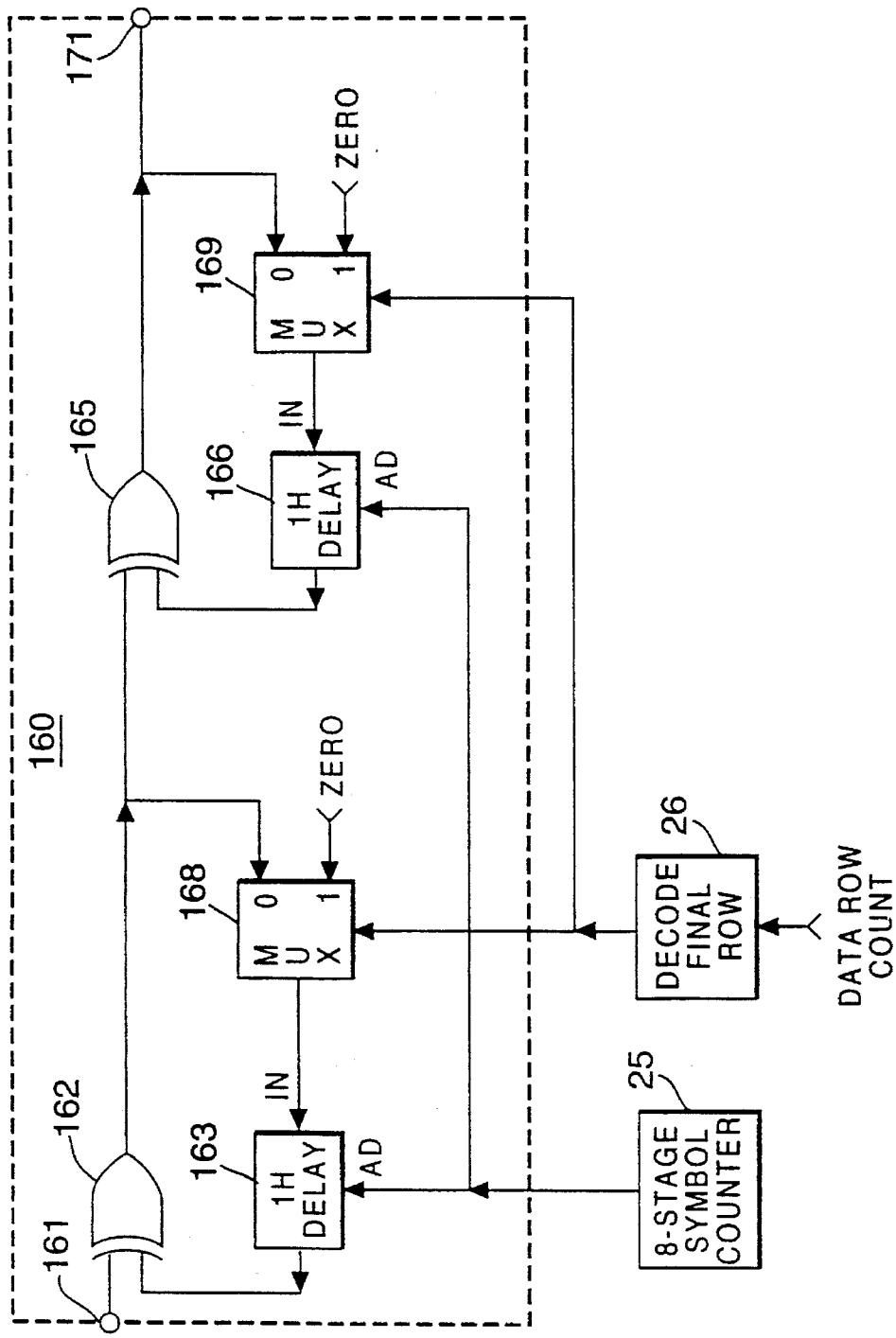
FIG. 4 is a schematic diagram of an alternative structure for the pre-line-comb partial-response filter.

FIG. 4 shows a modified pre-line-comb partial-response filter 160 that can be used instead of the pre-line-comb partial-response filter 16. The multiplexers 164 and 167 are dispensed with, and the outputs of the 1-H delay lines 163 and 166 connect directly to inputs of the XOR gates 162 and 165, respectively. The inputs of the 1-H delay lines 163 and 166 are not connected directly to the outputs of the XOR gates 162 and 165, respectively, but instead connect the outputs of two-input multiplexers 168 and 169, respectively. The multiplexers 168 and 169 have wired logic ZERO applied to their respective first inputs and have the outputs of the XOR gates 162 and 165 respectively applied to their respective second inputs. The control signals for the multiplexers 168 and 169 are provided by a decoder 26 that detects the DATA ROW COUNT from the counter 24 indicating the final row of a data frame has been reached to supply a logic ONE to the multiplexers 168 and 169, which conditions them to select logic ZEROs as their respective output signals. During all other rows of a data frame, the decoder 26 supplies a logic ZERO to the multiplexers 168 and 169, which conditions them to select the output responses of the XOR gates 162 and 165 as their respective output signals.

FIG. 5 is a schematic diagram of an alternative structure 170 for the pre-frame-comb partial-response filter 17 in which the XOR gate 172 output connection is to the output terminal 175 at all times, the multiplexer 174 being dispensed with. The read-only memory (ROM) 173 is read to a first input of a two-input multiplexer 177, the second input of which multiplexer 177 has applied thereto the one-frame-delayed output response of the 1-F digital delay line 176 to the pre-frame-comb partial-response filter response at the output terminal 175. The output response of the multiplexer 177 is applied to the second input of the XOR gate 172. The multiplexer 177 receives a control signal from the decoder 23. When the decoder 23 furnishes a logic ONE throughout each start frame, the multiplexer 177 responds to this condition of its control signal to apply the pattern of bits descriptive of a start frame of data read from the ROM 173 to the second input of the XOR gate 172. Since the first input of the XOR gate 172 is supplied ZEROs throughout the start frame, the pattern of bits read from the ROM 173 to the second input of the XOR gate 172 is replicated in its output response supplied to the output terminal 175. During data frames other than the start frame, the decoder 23 furnishes a logic ZERO to which the multiplexer 177 responds for applying to the second input of the XOR gate 172 the one-frame-delayed output response of the 1-F digital delay line 176 to the pre-frame-comb partial-response filter response at the output terminal 175. So, overall, the operation of the filter 170 is similar to that of filter 17 of FIG. 3.

FIG. 6 is a schematic diagram of another alternative structure 1700 for the pre-frame-comb partial-response filter 17 in which the XOR gate 172 output connection is to the output terminal 174 at all times, the multiplexer 174 being dispensed with. The read-only memory (ROM) 173 is read to a first input of a two-input multiplexer 178, the second input of which multiplexer 178 has the pre-frame-comb partial-response filter response at the output terminal 175 applied thereto. The output response of the multiplexer 178 is applied to the input of the 1-F digital delay line 176, and the second input of the XOR gate 172 receives the output response of the multiplexer 178 after a one-frame delay from the output of the 1-F digital delay line 176. The control signal for the multiplexer 178 is not from a start frame decoder 26, but rather from a decoder 27 that detects the DATA FRAME COUNT being full modular count (i.e., ZERO in all bit places) when the final frame of the pre-frame-comb partial-response filtering just before the start frame is reached. During every frame except this final frame, the decoder 27 furnishes a ZERO as control signal for the multiplexer 178, conditioning it to select the XOR gate 172 response to the input connection of the 1-F digital delay line 176, thereafter to be applied with one-frame delay to the second input of the XOR gate 172, just as is the case in the filter 17 of FIG. 3. During the final frame, the decoder 27 furnishes a ONE as control signal for the multiplexer 178, conditioning it to select the pattern of bits descriptive of a start frame read from the ROM 173 to the input connection of the 1-F digital delay line 176, thereafter to be applied with one-frame delay to the second input of the XOR gate 172. Accordingly, the pattern of bits descriptive of a start frame of data are applied to the second input of the XOR gate 172 during the start frame, just as is the case in the filter 170 of FIG. 5.

The reason the filter 17 of FIG. 3 is preferred over the filter 170 of FIG. 5 and the filter 1700 of FIG. 6 is that the start frame data are more directly applied to the output terminal 175, lessening the likelihood of occasional bit errors therein. The desire to avoid such occasional bit errors is the reason they are generated from a ROM 173 rather than being generated, which is easily done—by exclusive ORing the least significant bits of the SYMBOL PER DATA ROW COUNT and of the DATA ROW COUNT, for example. A number of different patterns of bits are suitable for use as a start frame. The pattern should have no DC component to unbalance the balanced modulator in the VSB AM data transmitter 12, so that the quadrature-phase video carrier can be kept suppressed so as not to disrupt the proper operation of TV receivers. Preferably the pattern is one that is easily recognized by the digital signal receiver and can be easily regenerated there should that be desired. A pattern composed of consecutive 1-H intervals of alternated ZEROs and ONEs, with the bit pattern reversed from each 1-H interval to the next, meets these criteria.

FIG. 7 shows a digital-signal receiver 40 for receiving, from means such as an antenna 42, a television signal with a digital signal buried therewithin and extracting the buried digital signal. A tuner 43 selects the television channel to be detected by the first detector therein, which first detector is a tunable down-converter, conventionally of superheterodyne type, for converting the selected television signal to a set of intermediate frequencies and an image set of frequencies. A video intermediate-frequency (IF) filter 44 selects the video intermediate frequencies for application as input signal to an intermediate-frequency (IF) amplifier 45 and rejects the image set of frequencies. Following the current custom a surface-acoustic-wave (SAW) filter can be used for the video IF filter 44 and to construct the video IF amplifier 45 within a monolithic integrated circuit (IC), as a multi-stage amplifier without interstage tuning. The video IF amplifier 45 supplies the amplified video IF signal to an in-phase synchronous video detector 46 and to a quadrature-phase synchronous video detector 47. An oscillator 48 oscillating with a nominal IF video carrier frequency of 45.75 MHz supplies its oscillations to the in-phase synchronous video detector 46 without phase shift and to a quadrature-phase synchronous video detector 47 with 90° lagging phase shift provided by a shift network 49. The oscillator 48 has automatic frequency and phase control (AFPC) responding to the output signal of the quadrature-phase synchronous video detector 47. The synchronous video detectors 46 and 47 are customarily included together with the video IF amplifier 45 and portions of the oscillator 48 within the IC. Each of the video detectors 46 and 47 may either be of exalted carrier type or of true synchronous type. In-phase modified composite video signal recovered by the in-phase synchronous video detector 46 is supplied to a horizontal sync separator 50 and to a vertical sync separator 51, which recover horizontal and vertical synchronizing pulses from the in-phase modified composite video signal, respectively.

The aspects of the digital-signal receiver 40 thusfar considered are generally familiar to persons skilled in the art of TV receiver design, although the video IF filter 44 is preferably made only about 3.5 MHz wide and is centered at about 45.25 MHz. This video IF filter 44 provides both in-channel and adjacent-channel sound rejection without need for sound trap filtering after the quadrature-phase video detector 47. This video IF filter 44 also suppresses chrominance components of the video signal detected by the in-phase video detector 46 and of the remnant composite video signal detected by the quadrature-phase video detector 47. The bandwidth of the quadrature-phase video detector 47 should be somewhat wider than symbol rate, so as not to attenuate the upper frequencies in the "tail" of BPSK response. The quadrature-phase video detector 47 detects the keying signal, accompanied by only those portions of the NTSC composite video signals at frequencies above 750 kHz.

In practice the digital signal receiver 40 usually will include ghost suppression circuitry, which is not separately and explicitly shown in FIG. 4, but can be of the type described in detail in U.S. patent application Ser. No. 08/108,311 filed Aug. 20, 1993. Each of the in-phase and quadrature-phase video detectors 46 and 47 includes, after its synchronous detector per se, respective ghost cancellation and equalization filters similar to those used after the synchronous detector per se included in the other video detector. The adjustable parameters of the two ghost-cancellation filters are adjusted in parallel responsive to calculations made in a computer, and the adjustable parameters of the two equalization filters are also adjusted in parallel responsive to further calculations made in the computer. Ghost-cancellation reference (GCR) signals, which extend up to 4.1 MHz in frequency when transmitted, but extend to only 2.5 MHz or so in a digital signal receiver because of its limited IF bandwidth, are extracted from selected vertical-blanking-interval (VBI) scan lines of the video signal detected by the in-phase synchronous video detector 46. The GCR signals are digitized and supplied as input signal to the computer for calculating the adjustable parameters of the ghost-cancellation and equalization filters. Alternatively or additionally, direct-current or low-frequency components in the quadrature-phase video detector 47 response can be sensed and used as a basis for calculating the adjustable parameters of the ghost-cancellation filters.

In the FIG. 7 digital-signal receiver 40, a SAMPLE-PER-SYMBOL COUNT signal is generated by a sample-per-symbol counter 103 counting pulses generated by a zero-crossing detector 104 in response to sinusoidal oscillations received from a voltage-controlled oscillator 105. The sample-per-symbol counter 103 has four stages and supplies an overflow carry each sixteenth average-axis crossing of the oscillator 105 oscillations. A SYMBOL COUNT signal is generated by a symbol counter 52 counting overflow carries from the sample-per-symbol counter 103. A decoder 55 decodes the SYMBOL COUNT reaching 255 to generate a pulse that resets the counters 103 and 52 on the next pulse supplied to the counter 103 by the zero-crossing detector 104, returning both SAMPLE-PER-SYMBOL COUNT and SYMBOL COUNT to arithmetic zero. The pulses generated by the decoder 55 are supplied to an AFPC detector 56 to be compared to the horizontal sync pulses H separated by the horizontal sync separator 50 and adjustably delayed for fractions of a symbol interval by a controlled delay line 57. The results of the comparison are lowpass filtered within the AFPC detector 56 to generate an automatic frequency and phase control (AFPC) voltage signal for application to the VCO 105. These arrangements control the frequency of the oscillations supplied from the line-locked VCO 105 to be 16×256= 4096 times the horizontal scan line frequency $f_H$, or 64,447,545 Hz. The term "line-locked" used in reference to a controlled oscillator means that the frequency of its oscillations is maintained in constant ratio to the 15,734.264 Hz scan line frequency, which is customarily done by AFPC circuitry comparing the frequency of its oscillations as divided by a suitable factor to horizontal synchronizing pulses.

The keying signal and accompanying portions of the NTSC composite video signals at frequencies above 750 kHz detected by the quadrature-phase video detector 47 are supplied to a match filter 58, which responds to the keying signal but only selected portions of the accompanying above-750-kHz frequency components of composite video signal. The match filter 58 provides a peaking response that matches with the roll-off of the transition-shaping portion of the filter 19 in the transmitter to extend PSK bandwidth enough to reduce inter-symbol interference. The match filter 58 can also provide further peaking response to compensate for the roll-off of the detection efficiency of the quadrature-phase video detector 47 attributable to the VSB BPSK becoming increasingly single sideband in nature over the frequency range extending between 0.75 and 1.25 MHz and being substantially single sideband in nature over the frequency range extending upward from 1.25 MHz. However, since the vestigial sideband filters of different TV transmitters exhibit variations from each other, the peaking response to compensate for the roll-off of the detection efficiency of the quadrature-phase video detector 47 is probably better done at each TV transmitter 1, by modifying the transition shaping filter 19 to provide the appropriate peaking response in addition to shaping transitions. This additional peaking or pre-emphasis of binary keying signal at the transmitter 1 will, however increase the high frequency content of the BPSK above 0.75 MHz that is transmitted together with luminance signal.

The response from the match filter 58 is applied as input signal to an analog-to-digital converter (ADC) 106, which is preferably of an oversampling type. The quadrature-phase video detector 47 recovers substantially no composite video signal frequencies below 750 kHz and the BPSK coding is such that it has no zero-frequency content. During the transmission of TV images without much energy in the frequencies above 750 kHz, the BPSK portion of the quadrature-phase synchronous video detector 47 response will alternate from one polarity to the other. So the ADC 106 is of a type capable of digitizing analog signal of either positive or negative polarity. More particularly, the ADC 106 is preferably a multi-bit sigma-delta converter with single-bit feedback, as described by T. C. Leslie and B. Singh of Plessey Research Caswell Ltd. in their paper "An Improved Sigma-Delta Modulator Architecture", 1990 IEEE SYMPOSIUM ON CIRCUITS & SYSTEMS, 90 CH 2868-8900000-0372, pp. 372–375. A flash converter with 8-bit resolution (which is of modest price) samples the error signal in a second-order sigma-delta feedback loop, and single-bit feedback is used to minimize digital-to-analog conversion errors. The second-order sigma-delta feedback loop is unconditionally stable. The error signal is sampled at sixteen times the symbol rate of 256 times horizontal scan line rate $f_H$ for a 16:1 oversampling ratio, sampling each time a pulse is received over a line 107 from the zero-crossing detector 104 each time it detects a zero crossing of oscillations from the oscillator 105. The digital output of the flash converter is supplied to an FIR lowpass filter within the converter 106, and the digital response of this filter is subsampled 16:1 by a subsampler sampling each time a pulse is received over a line 108 from the carry overflow of the sample-per-symbol counter 103. This decimation reduces the amount of storage capability required in the delay portions of the digital comb-filtering to follow. Subsampling at symbol rate, with optimal phasing, is a form of synchronous symbol detection which suppresses response to those components of the composite video signal that exhibit change at symbol rate, but are in quadrature phasing with the sampling at symbol rate. The lowpass filter preceding the subsampler suppresses the chrominance signal frequencies.

A single-bit ADC 109, sampling at sixteen times the symbol rate of 256 times horizontal scan line rate $f_H$ as responsive to pulses supplied by the zero-crossing detector 104 on the line 108, responds to the match filter 58 response to supply a sign bit descriptive of the polarity of the match filter 58 response. That sign bit and that sign bit as delayed one sample in a bit latch 110 are supplied as respective inputs to an exclusive-OR gate 111. The XOR gate 111 detects match filter 58 response, supplying the results of this detection to a pulse phase discriminator 67. The pulse phase discriminator 67 selectively detects departures of the zero-crossings of the match filter 58 response, as detected by the XOR gate 110, from proper phasing respective to the zero-crossings of the oscillations of the controlled oscillator 105, as detected by the zero-crossing detector 104. The pulse phase discriminator 67 lowpass filters these selectively detected departures, as sampled and held, thereby to generate a control signal for adjusting the delay the controlled delay line 57 provides for the horizontal sync pulses H applied to the AFPC detector 56. This selective detection by the pulse phase discriminator 67 can be done during portions of the vertical blanking interval when the response of quadrature-phase video detector 47 to composite video signals is expected to be zero-valued. The phasing of the oversampling by the flash converter in the ADC 107 during its digitization of second-order sigma-delta error signal is accordingly adjusted for minimal inter-symbol interference.

The arrangements for adjusting the phasing of the line-locked oscillator are of the type developed by Jung-Wan Ko, a co-worker with the inventors. The AFPC loop controlling the frequency and phasing of the oscillations of the controlled oscillator 105 with respect to the adjustably delayed horizontal sync pulses H supplied from the controlled delay line 57 provides a filtering function that avoids the ADC clocking exhibiting a "glitch" or pronounced shortening of periodicity during phase adjustment. Such glitches occur at times if fine phase adjustment is attempted in the ADC clocking itself.

The vertical sync separator 51 supplies "lossy" integrated response to separated vertical sync pulses V to a threshold detector 68, the threshold voltage of which is chosen such that it is exceeded only when the vertical sync pulses are integrated over more than five-and-a-half scan lines and less than six-and-a-half scan lines. The threshold detector 68 output signal, which is a ONE only when its input signal exceeds its threshold voltage and is otherwise a ZERO is supplied as a first input signal to a two-input AND gate 69. The decoder 55, which generates a ONE for the final value of SYMBOL COUNT in each data row (at the finishes of horizontal scan lines) and otherwise generates a ZERO, supplies its output signal to the AND gate 69 as a second input signal thereto. The AND gate 69 is responsive to the trailing edges of vertical pulses that occur at the beginning of the initial fields of composite video signal frames, to provide a respective DATA-FRAME-END pulse responsive to each of these edges, but is not responsive to the trailing edges of vertical pulses that occur between respective initial and final fields of frames. The DATA-FRAME-END pulses in the AND gate 69 response are supplied to a modulo-64 data frame counter 70 as count input (CI) signal, so as to advance a regenerated DATA FRAME COUNT signal, which is offset by one scan line from the DATA FRAME COUNT signal at the transmitter. A frame synchronizer 71 for resetting the data frame counter 70 will be described in detail further on in this specification, with reference to FIG. 14 of the drawing.

The DATA-FRAME-END pulses in the AND gate 69 response are also applied as a reset (R) signal to a data row counter 72 to reset the DATA ROW COUNT regenerated as its output signal, which should then be 524, to arithmetic zero. The data row counter 72 is connected to count the horizontal sync pulses H supplied from the horizontal sync separator 50. The DATA ROW COUNT is used to control the selection of the VBI scan lines containing GCR signals in the circuitry (not explicitly shown in FIG. 7) for acquiring data for the computer (also not explicitly shown in FIG. 7) that calculates the adjustable filtering parameters for the equalization and ghost-cancellation filters included within the video detectors 46 and 47.

A data separation filter 200 receives the digital response of the analog-to-digital converter 106 as input signal. Particular embodiments of the data separation filter 200 will be described further on in this specification with reference to FIGS. 9 and 10 of the drawing. The data separation filter 200 does not supply the separated data samples in binary form to ensuing symbol decision circuitry 230. The data separation filter 200 supplies data samples in 5-level form if the digital signal receiver 40 is designed for use with a digital signal transmitter using one section of pre-line-comb partial-response filtering, one section of pre-frame-comb partial-response filtering and no other partial-response filtering. The data separation filter 200 supplies data samples in 9-level form if the digital signal receiver 40 is designed for use with a digital signal transmitter using two sections of pre-line-comb partial-response filtering, one section of pre-frame-comb partial-response filtering and no other partial-response filtering. In the description of the symbol decision circuitry 230 that follows it is presumed that the data samples supplied thereto are in 9-level form.

Symbol decision circuitry 230 in such case has nine comparator ranges respectively centered on −4, −3, −2, −1, 0, +1, +2, +3 and +4. Symbol decision circuitry 230 includes an absolute-value circuit 231, which generates a rectified digital response to the output signal from the data separation filter 200. The rectified digital response of the absolute-value circuit 231 is descriptive of 5-level keying signal superposed on a direct-voltage pedestal, rather than being descriptive of binary coding of keying signal, so this rectified digital response is supplied to a quadruple-threshold detector 232.

The quadruple-threshold detector 232 receives the symbol stream from absolute-value circuit 231 and makes a decision as to whether the symbol is most likely a ZERO, is most likely a ONE, is most likely a TWO, is most likely a THREE, or is most likely a FOUR, TWOs and FOURs being equated to ZEROs and THREEs being equated to ONEs. The quadruple-threshold threshold detector 232 typically contains four digital comparators (each arranged to operate as single-threshold detector, second, third and fourth of these single-threshold detectors being operated at threshold digital values respectively two, three and four times as large as the threshold digital value the first of them is operated at) and some simple logic circuitry for deciding the identity of the symbol depending on the threshold detection results. If none of the threshold digital values is exceeded, if two and only two of the threshold digital values is exceeded, or if all four of the threshold digital values is exceeded, the logic circuitry indicates that the symbol is most likely a ZERO. If only the lower threshold digital value is exceeded, or if three and only three of the threshold digital values is exceeded, the logic circuitry indicates that the symbol is most likely a ONE. The quadruple-threshold threshold detector 232 is preferably of a type in which the digital values supplied to the comparators for determining the thresholds for threshold detection are automatically adjusted responsive to symbol strength. In such case, the quadruple-threshold threshold detector 232 has associated circuitry for detecting the average level of the symbol stream supplied by absolute-value circuit 231, or its average peak level, or both. There is circuitry for reckoning from each level detected the digital values supplied to the digital comparators to establish their respective thresholds for threshold detection. The detection procedures for determining symbol decision thresholds preferably are selectively implemented during the start frames, when the comb filtering results are samples code direct levels. Still more particularly, the detection procedures preferably are selectively implemented during the vertical blanking intervals of those start frames, when the composite video signal contributes almost no energy to the signal detected by the quadrature-phase video detector 47.

The symbol stream from the symbol decision circuitry 230 is supplied as input signal to a de-interleaver 77, which is conditioned by the least significant bit of the DATA FRAME COUNT to write different ones of two frame stores therewithin on alternate data frames and to read the one of these two frame stores not selected for writing. The write addresses for the frame store within the de-interleaver 77 selected for writing is formed from the DATA ROW COUNT supplied by the counter 72 and from the SYMBOL-PER-DATA-ROW COUNT supplied by the counter 52. The carry overflow pulses from the sample-per-symbol counter 103 are counted by a symbol-per-column counter 85 to generate a SYMBOL-PER-COLUMN COUNT; and the carry overflow pulses from the symbol-per-column counter 85 are counted by a data column counter 84 to generate a DATA COLUMN COUNT. The counters 84 and 85 are reset to initial count at the beginning of each data frame by the AND gate 69 response going to ONE. The DATA COLUMN COUNT and the SYMBOL-PER-COLUMN COUNT together provide the read addressing for the frame stores in the de-interleaver 77.

Digital samples are supplied from the de-interleaver 77 to an error-correction decoder 78. Decoder 78 converts its serial-bit digital input data to parallel-bit form and corrects the errors therein to provide corrected digital data, which are the output data of the digital signal receiver 40. The data in the start frames is normally discarded, and rate buffering can be used to get a constant data flow thereafter if desired.

Figure 8:
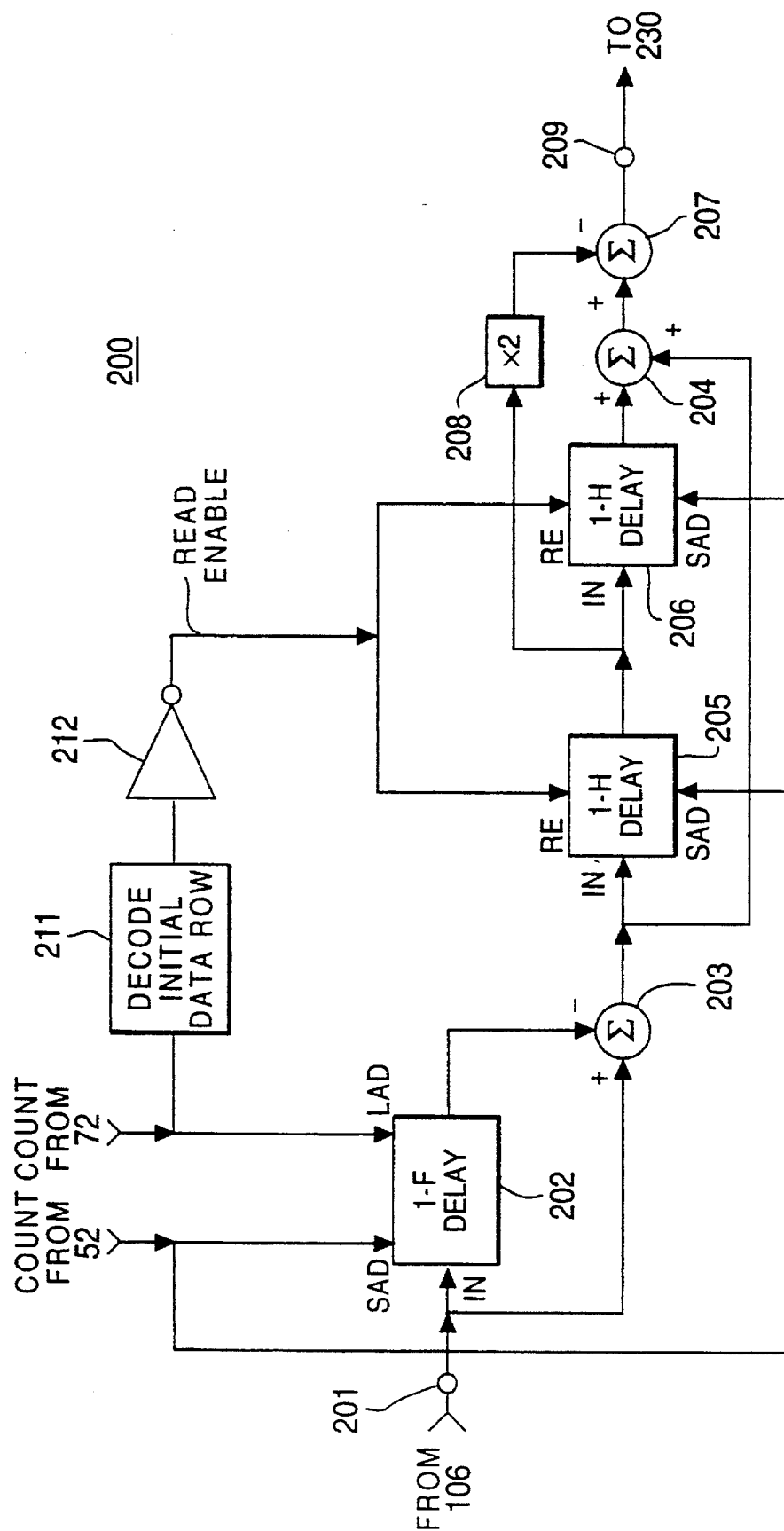

FIG. 8 shows one form the data separation filter 200 can take. An input terminal 201 of the filter 200 receives digital samples from the ADC 106 for application to the input of a one-frame digital delay line 202 and to the minuend input of a digital subtractor 203. The 1-F digital delay line 202 can be provided by a RAM operated in a read-and-then-write-over mode, which RAM is addressed by the SYMBOL PER DATA ROW COUNT from the counter 52 applied as column address and the DATA ROW COUNT supplied from the counter 72 applied as row address. A one-frame-delayed response to the digital samples received at the input terminal 201 is supplied from the output of the 1-F delay line 202 to the subtrahend input of the subtractor 203. The 1-F delay line 202 and the subtractor 203 together form a highpass frame-comb filter, supplying at the output of the subtractor 203 a highpass frame-comb filter response to the digital samples received at the input terminal 201.

The highpass frame-comb filter response from the output of the subtractor 203, in which response luma components descriptive of static images are suppressed, is supplied to a highpass line-comb filter that comprises elements 204–208 and that suppresses luma components descriptive of moving images in its response. A digital adder 204 receives as a first summand input the highpass frame-comb filter response as directly applied thereto from the output of the subtractor 203 and receives as a second summand input that response as delayed by a cascade connection of 1-H digital delay lines 205 and 206. The sum output from the adder 204 is applied to the minuend input of a digital subtractor 207, the difference output of which provides the highpass line-comb filter response to the highpass frame comb filter response supplied from the output of the subtractor 203. The highpass frame-comb filter response from the output of the subtractor 203, as delayed by the 1-H digital delay line 205, is doubled by a wired bit-place shift 208 and applied to the subtrahend input of the digital subtractor 207.

The response of the cascaded highpass frame-comb filter and highpass line-comb filter, in which response luma components descriptive of moving as well as static images are suppressed, is supplied from the output of the subtractor 207 to an output terminal 209 of the data separation filter 200 to the symbol decision circuitry 230.

The 1-H delay lines 205 and 206 can be constructed from respective RAMs addressed by the SYMBOL PER ROW COUNT (SAD) from the symbol counter 52 and operated in a read-then-write-over mode. The 1-H delay lines 205 and 206 are each arranged for supplying a respective row of ZEROs the first row of each data frame. The way for doing this shown in FIG. 8 uses a decoder 211 for detecting in the DATA ROW COUNT (LAD) from the counter 72 the occurrence of the initial row of each data frame, responding thereto to furnish a logic ONE as output signal and otherwise furnishing a logic ZERO as output signal. The output signal of the decoder 211 is supplied to a logic inverter 212, which responds to supply READ ENABLE SIGNAL to the 1-H delay lines 205 and 206 during every row of each data frame after its initial row, but not during its initial row. Each of the 1-H delay lines 205 and 206 has a respective multiplexer in its output circuitry that supplies ZEROs as output signal from that 1-H delay line when it is not supplied a READ ENABLE SIGNAL.

Figure 9:
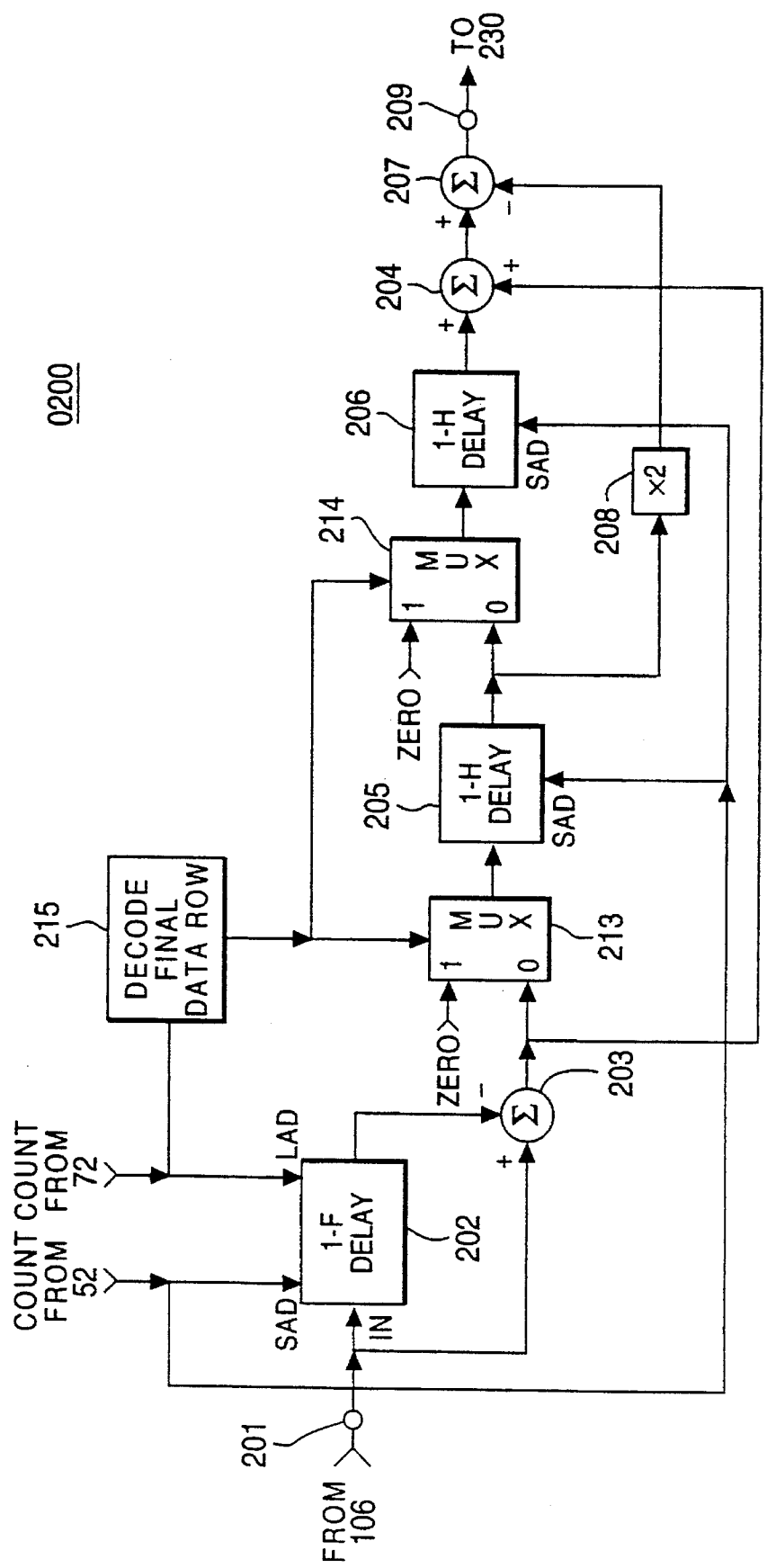

FIG. 9 shows an alternative form 0200 the data separation filter 200 can take, which differs from the form shown in FIG. 8 in regard to the way in which the 1-H delay lines 205 and 206 are each arranged for supplying a respective row of ZEROs the first row of each data frame. In FIG. 9 the highpass frame-comb filter response from the output of the subtractor 203 is not applied directly to the input of the 1-H digital delay line 205, and the delayed response of the 1-H digital delay line 205 is not applied directly to the input of the 1-H digital delay line 206. The input of the 1-H digital delay line 205 connects from the output of a two-input multiplexer 213. The multiplexer 213 receives a wired arithmetic zero at its first input; and at its second input the multiplexer 213 receives the highpass frame-comb filter response from the output of the subtractor 203. The input of the 1-H digital delay line 206 connects from the output of a two-input multiplexer 214. The multiplexer 214 receives a wired arithmetic zero at its first input; and at its second input the multiplexer 214 receives the delayed response from the output of the 1-H digital delay line 205. A decoder 215 detects in the DATA ROW COUNT (LAD) from the counter 72 the occurrence of the final row of each data frame, responding thereto to furnish a logic ONE as output signal and otherwise furnishing a logic ZERO as output signal. The logic ONE supplied by the decoder 215 during the final row of each data frame conditions the multiplexers 213 and 214 to load arithmetic-zero samples into the 1-H digital delay lines 205 and 206. The respective rows of ZEROs written into the 1-H delay lines 205 and 206 during the final row of each data frame are read out from the 1-H delay lines 205 and 206 during the first row of the following data frame.

FIG. 10 shows a modification 00200 of the data separation filter 200 of FIG. 8, used when the transmitter 1 uses only a single section of pre-line-comb partial-response filtering. Elements 204, 206 and 208 are dispensed with; and the highpass frame-comb filter response from the output of the subtractor 203 and that response as delayed by the 1-H digital delay line 205 are applied to the subtractor 207 as minuend and subtrahend inputs, respectively.

FIG. 11 shows a modification 000200 of the data separation filter 0200 of FIG. 9, used when the transmitter 1 uses only a single section of pre-line-comb partial-response filtering. Elements 204, 206, 208 and 214 are dispensed with; and the highpass frame-comb filter response from the output of the subtractor 203 and that response as delayed by the 1-H digital delay line 205 are applied to the subtractor 207 as minuend and subtrahend inputs, respectively.

FIGS. 12 and 13 show how the FIG. 10 data separation filter 00200 or the FIG. 11 data separation filter 000200 can be used when the transmitter 1 uses two sections of pre-line-comb partial-response filtering and a section of pre-frame-comb partial-response filtering—per FIG. 3, for example. When the data separation filter 00200 of FIG. 10 or the data separation filter 000200 of FIG. 11 is used, the symbol decision circuitry 230 is replaced by symbol decision circuitry 240 shown in each of FIGS. 12 and 13. This replacement can be desirable to do because the design of symbol decision circuitry 240 for accurately deciding what is encoded in a 5-level digital sample is considerably easier than the design of symbol decision circuitry 230 for accurately deciding what is encoded in a 9-level digital sample, particularly when there are constraints on the resolution of the ADC converter.

The symbol decision circuitry 240 has five comparator ranges centered on −2, −1, 0, +1 and +2. The symbol decision circuitry 240 includes an absolute-value circuit 241, which generates a rectified digital response to the output signal from the data separation filter. The rectified digital response of the absolute-value circuit 241 is descriptive of ternary coding of keying signal superposed on a direct-voltage pedestal, rather than being descriptive of binary coding of keying signal, so this rectified digital response is supplied to a dual-threshold detector 242. The dual-threshold threshold detector 241 receives the symbol stream from absolute-value circuit 241 and makes a decision as to whether the symbol is most likely a ZERO, is most likely a ONE or is most likely a TWO, TWOs being equated to ZEROs. The dual-threshold threshold detector 242 typically contains two digital comparators each arranged to operate as single-threshold detector, one at a threshold digital value twice as large as the other, and some simple logic circuitry for deciding the identity of the symbol depending on the threshold detection results. If neither threshold digital value is exceeded, the logic circuitry indicates that the symbol is most likely a ZERO. If only the lower threshold digital value is exceeded, the logic circuitry indicates that the symbol is most likely a ONE. If both the lower and higher threshold digital values are exceeded, the logic circuitry indicates that the symbol is most likely a TWO and it is equated to ZERO. The dual-threshold threshold detector 242 is preferably of a type in which the digital values supplied to the comparators for determining the thresholds for threshold detection are automatically adjusted responsive to symbol strength, which is done by procedures similar to those described above in respect to the quadruple-threshold threshold detector 232.

In FIG. 12 the bit-serial output signal of the symbol decision circuitry 240 is passed through a data filter 250 before it is applied to the de-interleaver 77, which data filter 250 undoes what is done by one of the sections of pre-line-comb partial-response filtering at the transmitter 1. More particularly, the bit-serial output signal of the symbol decision circuitry 240 is applied via an input terminal 251 of data filter 250 to a first input of an exclusive-OR gate 252 and to the input of a 1-H digital delay line 253. A two-input multiplexer 254, the first input of which receives a wired logic ZERO, has its second input connected to the output of a 1-H digital delay line 253 for receiving the bit-serial output signal of the symbol decision circuitry 240 as delayed by the duration of one horizontal scan line. The output signal of the decoder 220 is applied to the multiplexer 254 as its control signal, conditioning the multiplexer 254 to apply to the second input of the XOR gate 252 a logic ZERO when and only when the initial row of a data frame is detected by the decoder 220, and otherwise conditioning the multiplexer 254 to apply to the second input of the XOR gate 252 the bit-serial output signal of the symbol decision circuitry 240 as delayed by the duration of one horizontal scan line. The response of the XOR gate 252 is supplied via an output terminal 255 of data filter 250 to the input of the de-interleaver 77.

In FIG. 13 the bit-serial output signal of the symbol decision circuitry 240 is passed through a data filter 260 before it is applied to the de-interleaver 77, which data filter 260 undoes what is done by one of the sections of pre-line-comb partial-response filtering at the transmitter 1. More particularly, the bit-serial output signal of the symbol decision circuitry 240 is applied via an input terminal 261 of data filter 260 to a first input of an exclusive-OR gate 26. A two-input multiplexer 263, the first input of which receives a wired logic ZERO and the second input of which connects from the input terminal 261, has an output connection to the input of a 1-H digital delay line 264. The output signal of the multiplexer 263, as delayed by the duration of one horizontal scan line, is applied from the output of the 1-H digital delay line 264 to the second input of the XOR gate 262. The output signal of a decoder 222 is applied to the multiplexer 263 as its control signal, conditioning the multiplexer 263 to apply to the input of the 1-H digital delay line 264 a logic ZERO when and only when the final row of a data frame is detected by the decoder 222, and otherwise conditioning the multiplexer 263 to apply to the input of a 1-H digital delay line 264 the bit-serial output signal of the symbol decision circuitry 240 as supplied to the second input of the multiplexer 263 via the input terminal 261. The response of the XOR gate 262 is supplied via an output terminal 265 of data filter 260 to the input of the de-interleaver 77.

The symbol decision circuits 230 and 240 as described above makes "hard" decisions to supply binary input signal into the decoder 79, for implementing what data communications engineers term "hard-decision" forward error correction. The decoder 79 and the symbol decision circuit 230 or 240 can be replaced with circuitry that supplies input signals with multiple levels into a suitable decoder, for implementing what data communications engineers term "soft-decision" forward error correction instead, of course. The de-interleaver is relocated to precede the decoder for implementing "soft-decision" forward error correction; and the memories for the de-interleaver no longer can be single-bit per sample but must be; multiple-bit per sample for storing the multiple-bit samples of the data separation filter 200 response.

FIG. 14 shows how the frame synchronizer 71 for resetting the modulo-64 data frame counter 70 can be arranged in the digital signal receiver 40. The frame synchronizer 71 comprises elements 711–718. Except during a start frame, the current data frame recovered by the digital signal receiver and the preceding data frame will exhibit substantially random patterns of correlation and anti-correlation between their respective bits at locations with corresponding row and symbol-per-row addresses within each data frame. These patterns are established by exclusive-OR of the current data frame and its predecessor, which corresponds to both the modulo-2 sum and modulo-2 difference of these frames insofar as the binary data from the symbol decision circuitry 230 or 240 is concerned. During the start frame, the digital signal receiver 40 erroneously combines the start frame pattern with the previous data frame to generate their modulo-2 sum. To detect the start frame without the previous data frame being added modulo-2 thereto, the previous data frame is subtracted modulo-2 from this modulo-2 sum. This modulo-2 subtraction is carried out by applying the binary output signal from the symbol decision circuitry 230 or 240 and that binary output signal as delayed by one frame in a 1-F digital delay line 711 to first and second inputs of a two-input exclusive-OR gate 712. The response of the XOR gate 712 during the start frame will be the start frame bit pattern during the start frame.

A two-input exclusive-OR gate 713 responds to the least significant bit of the SYMBOL-PER-DATA-ROW COUNT from the counter 52 and to the least significant bit of the DATA ROW COUNT from the counter 72 to generate a start frame bit pattern applied to the first input of a two-input XOR gate 714 which receives the response of the XOR gate 712 at its second input, and which supplies a logic ONE at its output when and only when a bit of the XOR gate 712 response fails to correspond to a bit of the start frame bit pattern. The response of the XOR gate 714 is applied to the input of a NOT gate 715, which supplies a logic ONE at its output when and only when a bit of the XOR gate 712 response does correspond to a bit of the start frame bit pattern. The ONEs in the response of the NOT gate 715 are counted by a counter 716. The counter 716 has the capability to count all or substantially all the bits in a data frame and is reset to arithmetic zero at the beginning of each data frame by a pulse from the AND gate 69. The counter 716 operates as a digital integrator, generating an indication of the degree of correlation the response of the XOR gate 712 has with the start frame bit pattern over the course of each data frame. The count from the counter 716 is applied as an input signal to a digital threshold detector 717, which furnishes a logic ONE output signal when and only when that count exceeds a number somewhat smaller than the number of bits per frame—e.g. a number near three-quarters the number of bits per frame. The output signal of the threshold detector 717, which is otherwise a logic ZERO, is applied to the data frame counter 70 for resetting the five most significant bits of the DATA FRAME COUNT to 0 0000. A detector 718 resets the three least significant bits of the DATA FRAME COUNT each to ZERO in the data frame following the final frame of the 8-frame GCR signal cycle responsive to indications thereof from a computer 41.

The computer 41 is the computer used for computing the filtering coefficients of ghost suppression filters included in the video detectors 46 and 47. More particularly, as shown in FIG. 14, the in-phase video detector 46 includes a synchronous detector 461 followed by a ghost suppression filter 462, and the quadrature-phase video detector 47 includes a synchronous detector 471 followed by a ghost suppression filter 472 GCR signal accumulation circuitry 39 accumulates the GCR signals supplied from the in-phase video detector 46 during the $19^{th}$ and $271^{st}$ lines of each video frame, as controlled by decoders (not shown in FIG. 14) that decode the DATA ROW COUNT being 10 or 262 to enable the accumulation of the GCR signal by circuitry 39. Every eighth frame the accumulated GCR signal is loaded into the computer 41 responsive to indications therefrom that the final frame of the 8-frame GCR signal cycle has been reached.

In a variant of the circuitry just described the computer 41 accumulates the GCR signals over two eight-frame cycles and issues indications that the last of the 16 frames has been reached, to reset the GCR signal accumulator 39 and to enable the detector 718 to reset the four least significant bits of the DATA FRAME COUNT each to ZERO. In such variant a ONE from the threshold detector 717 resets only the three most significant bits of the DATA FRAME COUNT each to ZERO.

In practice, the separate 1-F digital delay line 711 may not be used, the binary output signal from the symbol decision circuitry 230 or 240 as delayed by one frame being obtained instead by reading from one of the pair of alternately written and read frame store memories in the de-interleaver 77 currently being read to the error-correction code decoder 78, doubling the number of read cycles for those frame stores. In variants of the invention the transmitter signals the transmission of the start frame in the data in the start frame, in the data in the frame before the start frame, or in the vertical blanking interval of the accompanying composite video signal; and the digital signal receiver responds to this signaling to rest the data frame counter 70 appropriately.

The data transmission scheme as thusfar described in this specification provides for a single, reasonably-wideband data transmission channel. A variety of different services can be provided via this single data transmission channel using time-division-multiplex schemes of various types. For example, data can be transmitted in packets with each successive packet being provided header information for indicating the nature of the data service provided and the originator of the data service. The television broadcasters and the cablecaster can be originators of various data services. In two-way data transmission schemes the packet heading identifying the originator can be used for selecting the proper data return channel, such as a telephone link or a dedicated channel in a cablecast system. Time-slot allocation techniques can be used instead of or in addition to data packet transmission techniques.

FIG. 14 shows the modulo-64 DATA FRAME COUNT from the counter 70 and the DATA COLUMN COUNT from the counter 84 being decoded by a user controlled time-slot decoder 260 to select a time slot in the digital signal during which the decoder 260 furnishes a ONE to a battery 261 of tri-state circuits to enable it to pass data. At other times, when the decoder 260 furnishes a ZERO to the battery 261 of tri-state circuits, each of the tri-state circuits is conditioned to be in its high-source-impedance state so data is not passed. Respective pull-ups or pull-downs at the outputs of the tri-state circuits set their output logic states. The time-slot decoder 260 and the battery 261 of tri-state circuits can be used merely to nullify the data arising from the exclusive-ORing of the start frame with the preceding data frame. The time-slot decoder 260 can also be used in connection with the writing of memory in a rate buffer for selected output data.

Since none of the comb filtering or partial-response filtering done in the digital signal receiver 40 involves the feeding back of delayed output signal, it is unnecessary to periodically reset the partial-response filtering done at the transmitter or to reset the filtering done in the digital signal receiver 40. This avoids the need for transmitting start frames of data. The combining of signals that are differentially delayed by one frame that is done in the digital signal receiver 40 removes the effects of pre-frame-comb partial-response filtering done at the transmitter. Each combining of signals that are differentially delayed by one line that is done in the digital signal receiver 40 removes the effects of one section of pre-line-comb partial-response filtering done at the transmitter.

FIG. 15 shows a modification 200' of the data separation filter 200 that includes, in cascade after its frame-comb and line-comb filter elements, a finite-impulse-response digital lowpass filter 225 for suppressing chrominance signal. If the match filter 58 is designed so its response cuts off above a frequency that is below the chrominance frequencies, the digital lowpass filter 225 will not be needed.

The embodiments of the invention currently preferred by the inventors have been described, but one skilled in the art of communications systems, transmitter and receiver design will be enabled by acquaintance with the foregoing disclosure to design a number of alternative embodiments of the invention; and this should be borne in mind when construing the scope of the claims which follow this specification.

What is claimed is:

1. A system for transmitting digital information together with a composite video signal, said system including:

a source of audio signal;

a source of composite video signal descriptive of successive horizontal scan lines of successive video frames, said successive video frames having a prescribed video frame rate, said successive horizontal scan lines having a prescribed horizontal scan line rate, and each of said video frames consisting of a prescribed number of horizontal scan lines of said composite video signal, said composite video signal having horizontal and vertical synchronizing pulses inserted therewithin;

a source of binary phase-shift-keying signal encoding said digital information as expressed in a serial-bit digital signal, including a source of successive data frames each of which data frames is the same duration as a video frame and is comprised of rows of said serial-bit digital signal supplied in data rows each of which data rows is the same duration as a horizontal scan line, including means for partial-response filtering said serial-bit digital signal to generate a digital modulating signal, and including a digital-to-analog converter having an input connection to which said digital modulating signal is applied and having an output connection from which said binary phase-shift-keying signal is supplied;

a frequency-modulation transmitter for modulating the frequency of an audio carrier wave in accordance with said audio signal, thereby to generate a respective output signal;

a first vestigial-sideband amplitude-modulation transmitter for modulating the amplitude of a video carrier wave in accordance with said composite video signal, thereby to generate a respective output signal;

a second vestigial-sideband amplitude-modulation transmitter for modulating the amplitude of a suppressed carrier wave in accordance with said binary phase-shift-keying signal, thereby to generate a respective output signal;

a frequency multiplexer for combining the respective output signals of said first and second vestigial-sideband amplitude-modulation transmitters with the output signal of said frequency-modulation transmitter; and an improvement wherein said means for partial-response filtering said serial-bit digital signal comprises:

a pre-frame-comb partial response filter having an input terminal and having an output terminal for supplying a pre-frame-comb partial-response filter response;

means for applying said serial-bit digital signal to the input terminal of said pre-frame-comb partial-response filter; and means for using said pre-frame-comb partial-response filter response to provide said digital modulating signal.

2. A system as set forth in claim 1, wherein said suppressed carrier wave is of the same frequency as said video carrier wave, and wherein said frequency multiplexer is of a type for combining the respective output signals of said first and second vestigial-sideband amplitude-modulation transmitters such that said suppressed carrier wave is in quadrature phasing with said video carrier wave.

3. A system as set forth in claim 1, wherein:

a pre-line-comb partial-response filter is included in one of (a) said means for applying said serial-bit digital signal to the input terminal of said pre-frame-comb partial-response filter and (b) said means for using said pre-frame-comb partial-response filter response to provide said digital modulating signal.

4. A system as set forth in claim 3, wherein said means for using said pre-frame-comb partial-response filter response to provide said digital modulating signal consists of the output connection of said pre-frame-comb partial-response filter being to the input connection of said digital-to-analog converter, and wherein said means for applying said serial-bit digital signal to the input connection of said pre-frame-comb partial-response filter includes said pre-line-comb partial-response filter.

5. A system as set forth in claim 3, wherein said pre-frame-comb partial-response filter comprises:

a two-input first exclusive,OR gate having a first input connection from the input terminal of said pre-framecomb partial-response filter, having a second input connection, and having an output connection at which a first exclusive-OR gate response is provided;

means for generating a start-frame pattern at an output connection thereof;

a two-input first multiplexer having a first input connection for receiving said start-frame pattern, having a second input connection from the output connection of said first exclusive-OR gate, having an output connection to the output terminal of said pre-frame-comb partial-response filter, and selectively responding at its said output connection to one of respective input signals at its first and second input connections;

means for applying a first multiplexer control signal to said first multiplexer that conditions said first multiplexer to respond at its said output connection to said start-frame pattern only during selected ones of said data frames separated from each other by others of said data frames; and a first digital delay line having an input connection from the output connection of said pre-frame-comb partial-response filter and having an output connection to the second input connection of said first exclusive-OR gate, said first digital delay line delaying said frame-comb partial-response filter response as applied to the second input connection of said first exclusive-OR gate for a time interval equal to the duration of a data frame.

6. A system as set forth in claim 3, wherein said pre-frame-comb partial-response filter comprises:

a two-input first exclusive-OR gate having a first input connection from the input terminal of said pre-frame-comb partial-response filter, having a second input connection, and having an output connection to the output terminal of said pre-frame-comb partial-response filter, at which a first exclusive-OR gate response is provided;

means for generating a start-frame pattern at an output connection thereof;

a two-input first multiplexer having a first input connection for receiving said start-frame pattern, having a second input connection from the output connection of said first exclusive-OR gate, having an output connection, and selectively responding at its said output connection to one of respective input signals at its first and second input connections;

means for applying a first multiplexer control signal to said first multiplexer that conditions said first multiplexer to respond at its said output connection to said start-frame pattern only during selected ones of said data frame is separated from each other by others of said data frames; and a first digital delay line having an input connection from the output connection of said first multiplexer and having an output connection to the second input connection of said first exclusive-OR gate, said first digital delay line delaying said pre-frame-comb partial-response filter response as applied to the second input connection of said first exclusive-OR gate for a time interval equal to the duration of a data frame.

7. A system as set forth in claim 3, wherein said pre-frame-comb partial-response filter comprises:

a two-input first exclusive-OR gate having a first input connection from the input terminal of said pre-frame-comb partial-response filter, having a second input connection, and having an output connection to the output terminal of said pre-frame-comb partial-response filter, at which a first exclusive-OR gate response is provided;

a first digital delay line having an input connection to which said first exclusive-OR gate response is applied and having an output connection for supplying said first exclusive-OR gate response after being delayed for a time interval equal to the duration of a data frame;

means for generating a start-frame pattern at an output connection thereof;

a two-input first multiplexer having a first input connection for receiving said start-frame pattern, having a second input connection from the output connection of said first digital delay line, having an output connection to the second input connection of said first exclusive-OR gate, and selectively responding at its said output connection to one of respective input signals at its first and second input connections; and means for applying a first multiplexer control signal to said first multiplexer that conditions said first multiplexer to respond at its said output connection to said start-frame pattern only during selected ones of said data frames separated from each other by others of said data frames.

8. A system as set forth in any one of claims 5, 6 and 7 wherein said pre-line-comb partial-response filter comprises:

an input terminal for said pre-line-comb partial-response filter;

an output terminal for said pre-line-comb partial-response filter;

a two-input second exclusive-OR gate having a first input connection from the input terminal of said pre-line-comb partial-response filter, having a second input connection, and having an output connection to the output terminal of said pre-line-comb partial-response filter for supplying a second exclusive-OR gate response thereto;

a two-input second multiplexer having a first input connection for receiving a wired bit, having a second input connection from the output connection of said second exclusive-OR gate, and having an output connection for supplying selected response to one of respective input signals at its first and second input connections;

means for applying a second multiplexer control signal to said second multiplexer that conditions its selected response to be to said wired bit only during the initial row of data in each data frame; and a second digital delay line having an input connection from the output connection of said second multiplexer and having an output connection to the second input connection of said second exclusive-OR gate for supplying the selected response after being delayed for a time interval equal to the duration of a data row.

9. A system as set forth in any one of claims 5, 6 and 7 wherein said pre-line-comb partial-response filter comprises:

an input terminal for said pre-line-comb partial-response filter;

an output terminal for said pre-line-comb partial-response filter;

a two-input second exclusive-OR gate having a first input connection from the input terminal of said pre-line-comb partial-response filter, having a second input connection, and having an output connection to the output terminal of said pre-line-comb partial-response filter for supplying a second exclusive-OR gate response thereto;

a second digital delay line having an input connection to which said second exclusive-OR gate response is applied and having an output connection for supplying said second exclusive-OR gate response after being delayed for a time interval equal to the duration of a data row;

a two-input second multiplexer having a first input connection for receiving a wired bit, having a second input connection from the output connection of said second digital delay line and having an output connection to the second input connection of said second exclusive-OR gate, and selectively responding at its said output connection to one of respective input signals at its first and second input connections; and means for applying a second multiplexer control signal to said second multiplexer that conditions its selected response to be to said wired bit only during the final row of data in each data frame.

10. A system as set forth in any one of claims 5, 6 and 7 wherein said pre-line-comb partial-response filter comprises:

an input terminal for said pre-line-comb partial-response filter;

an output terminal for said pre-line-comb partial-response filter;

a two-input second exclusive-OR gate having a first input connection from the input terminal of said pre-line-comb partial-response filter, having a second input connection, and having an output connection for supplying a second exclusive-OR gate response therefrom;

a two-input second multiplexer having a first input connection for receiving a wired bit, having a second input connection from the output connection of said second exclusive-OR gate, and having an output connection for supplying selected response to one of respective input signals at its first and second input connections;

means for applying a second multiplexer control signal to said second multiplexer that conditions its selected response to be to said wired bit only during the initial row of data in each data frame;

a second digital delay line having an input connection from the output connection of said second multiplexer and having an output connection to the second input connection of said second exclusive-OR gate for supplying the selected response after being delayed for a time interval equal to the duration of a data row;

a two-input third exclusive-OR gate having a first input connection from the output connection of said second exclusive-OR gate, having a second input connection, and having an output connection to the output terminal of said pre-line-comb partial-response filter for supplying a third exclusive-OR gate response thereto;

a two-input third multiplexer having a first input connection for receiving a wired bit, having a second input connection from the output connection of said third exclusive-OR gate, and having an output connection for supplying selected response to one of respective input signals at its first and second input connections;

means for applying a third multiplexer control signal to said third multiplexer that conditions its selected response to be to said wired bit only during the initial row of data in each data frame; and a third digital delay line having an input connection from the output connection of said third multiplexer and having an output connection to the second input connection of said third exclusive-OR gate for supplying the selected response after being delayed for a time interval equal to the duration of a data row.

11. A system as set forth in any one of claims 5, 6 and 7 wherein said pre-line-comb partial-response filter comprises:

an input terminal for said pre-line-comb partial-response filter;

an output terminal for said pre-line-comb partial-response filter;

a two-input second exclusive-OR gate having a first input connection from the input terminal of said pre-line-comb partial-response filter, having a second input connection, and having an output connection for supplying a second exclusive-OR gate response therefrom;

a second digital delay line having an input connection to which said second exclusive-OR gate response is applied and having an output connection for supplying said second exclusive-OR gate response after being delayed for a time interval equal to the duration of a data row;

a two-input second multiplexer having a first input connection for receiving a wired bit, having a second input connection from the output connection of said second digital delay line and having an output connection to the second input connection of said second exclusive-OR gate, and selectively responding at its said output connection to one of respective input signals at its first and second input connections;

means for applying a second multiplexer control signal to said second multiplexer that conditions its selected response to be to said wired bit only during the final row of data in each data frame;

a two-input third exclusive-OR gate having a first input connection from the input terminal of said third exclusive-OR gate, having a second input connection, and having an output connection to the output terminal of said pre-line-comb partial-response filter for supplying a third exclusive-OR gate response thereto;

a third digital delay line having an input connection to which said third exclusive-OR gate response is applied and having an output connection for supplying said third exclusive-OR gate response after being delayed for a time interval equal to the duration of a data row;

a two-input third multiplexer having a first input connection for receiving a wired bit, having a second input connection from the output connection of said third digital delay line and having an output connection to the second input connection of said third exclusive-OR gate, and selectively responding at its said output connection to one of respective input signals at its first and second input connections; and means for applying a third multiplexer control signal to said third multiplexer that conditions its selected response to be to said wired bit only during the final row of data in each data frame.

12. A digital signal receiver for use with a system which in a combined transmission with a video carrier wave serially transmits digital symbols in binary phase-shift keying modulation sidebands of a suppressed carrier wave, the amplitude of said video carrier wave being modulated in accordance with a composite video signal having a luminance signal component and a chrominance signal component, said digital signal receiver comprising:

detection apparatus responsive to said combined transmission to supply a detector response composed of a desired detector response and an undesired detector response, detecting the binary phase-shift keying of said suppressed carrier wave thereby to generate said desired detector response, as accompanied by said undesired detector response composed of remnants of the composite video signal detected from the amplitude-modulated video carrier wave;

an analog-to-digital converter for digitizing said detector response; and a data separation filter having an input terminal receptive of said digitized detector response and having an output terminal for supplying a plural-level response to said digital symbols, said plural-level response being primarily dependent on said desired detector response rather than on said undesired detector response, said data separation filter being of an improved type including a frame-comb filter.

13. A digital signal receiver as set forth in claim 12 wherein said frame-comb filter is a highpass digital frame-comb filter for suppressing said luminance signal.

14. A digital signal receiver as set forth in claim 13 wherein said data separation filter of an improved type further comprises:

a digital highpass line-comb filter, having an input terminal connected from the output terminal of said digital highpass frame-comb filter, and having an output terminal;

a finite-impulse-response digital lowpass filter for suppressing said chrominance signal, having an input terminal connected from the output terminal of said digital highpass line-comb filter, and having an output terminal for supplying the plural-level response to said digital symbols that is supplied from the output terminal of said data separation filter.

15. A digital signal receiver as set forth in claim 13, wherein said data separation filter of an improved type further comprises a digital highpass line-comb filter that comprises, in addition to its said input and output terminals:

first and second one-line digital delay lines, said first one-line digital delay line having a respective input connection from said input terminal of said digital highpass line-comb filter for receiving an input signal for said digital highpass line-comb filter and having a respective output connection for providing a response to said input signal for said digital highpass line-comb filter after a delay equal to the duration of a scan line of video signal, said second one-line digital delay line having a respective input connection from the output connection of said first one-line digital delay line and having a respective output connection for providing a response to said input signal for said digital highpass line-comb filter after a delay equal to the duration of two scan lines of video signal;

a digital adder receiving said input signal for said digital highpass line-comb filter from said input terminal thereof as a first summand input signal, receiving said input signal for said digital highpass line-comb filter after a delay equal to the duration of two scan lines of video signal from the output connection of said second one-line digital delay line as a second summand input signal, and supplying a sum response, which sum response is responsive to the first and second summand input signals of said digital adder; and a digital subtractor receiving said sum response from said digital adder and receiving twice said input signal for said digital highpass line-comb filter after a delay equal to the duration of one line of video signal from the output connection of said first one-line digital delay line, as respective ones of its minuend and subtrahend input signals, and supplying to said output terminal a differential response, which differential response is responsive to the minuend and subtrahend input signals of said digital subtractor and supplies the response of said digital highpass line-comb filter via its said output terminal.

16. A digital signal receiver as set forth in claim 15 wherein the output terminal of said data separation filter is connected for supplying said response primarily dependent on said desired detector response to symbol decision circuitry of a nine-level type.

17. A digital signal receiver as set forth in claim 16 wherein said symbol decision circuitry comprises:

an absolute-value circuit having an input connection for receiving said response primarily dependent on said desired detector response from the output terminal of said data separation filter and having an output connection for :supplying a rectified response; and a quadruple-threshold detector having an input connection for receiving said rectified response: from the output connection of said absolute-value circuit and having an output connection for supplying bits of a digital signal, each bit being in a first state when said rectified response exceeds a first threshold level but not a second threshold level twice higher than the first threshold level, each bit being in said first state when said rectified response exceeds a third threshold level thrice said first threshold level but not a fourth threshold level four times higher than the first threshold level, each bit being in a second state when said rectified response does not exceed said first threshold level, each bit being in said second state when said rectified: response exceeds said second threshold but not said third threshold level, and each bit being in said second state when said rectified response exceeds said fourth threshold level, one of said first and said second states being representative of logic ONE and the other being representative of logic ZERO.

18. A digital signal receiver as set forth in claim 17 wherein said symbol decision circuitry is followed by a de-interleaver and then by a decoder for forward-error correction coding.

19. A digital signal receiver as set forth in claim 14, wherein said digital highpass line-comb filter :comprises, in addition to its said input and output terminals:

a first one-line digital delay line, having a respective input connection from said input terminal of said digital highpass line-comb filter for receiving an input signal for said digital highpass line-comb filter, and having a respective output connection for providing a response to said input signal for said digital highpass line-comb filter after a delay equal to the duration of a scan line of video signal; and a digital subtractor receiving input signal for said digital highpass line-comb filter from said input terminal thereof and receiving said input signal for said digital highpass line-comb filter after a delay equal to the duration of one scan line of video signal from the output connection of said first one-line digital delay line, as respective ones of its minuend and subtrahend input signals, and supplying to said output terminal a differential response, which differential response is responsive to the minuend and subtrahend input signals of said digital subtractor and supplies the response of said digital highpass line-comb filter via its said output terminal.

20. A digital signal receiver as set forth in claim 19 wherein the output terminal of said data separation filter is connected for supplying said response primarily dependent on said desired detector response to symbol decision circuitry of a five-level type.

21. A digital signal receiver as set forth in claim 20 wherein said symbol decision circuitry comprises:

an absolute-value circuit having an input connection for receiving said response primarily dependent on said desired detector response from the output terminal of said data separation filter and having an output connection for supplying a rectified response; and a triple-threshold detector having an input connection for receiving said rectified response from the output connection of said absolute-value circuit and having an output connection for supplying bits of a digital signal, each bit being in a first state when said rectified response exceeds a first threshold level but not a second threshold level twice higher than the first threshold level, each bit being in said first state when said rectified response exceeds a third threshold level thrice said first threshold level, each bit being in a second state when said rectified response does not exceed said first threshold level, and each bit being in said second state when said rectified response exceeds said second threshold but not said third threshold level, one of said first and said second states being representative of logic ONE and the other being representative of logic ZERO.

22. A digital signal receiver as set forth in claim 21 wherein said symbol decision circuitry is followed by a de-interleaver and then by a decoder for forward-error, correction coding.

23. A digital signal receiver as set forth in claim 20; wherein said symbol decision circuitry is followed by a data filter comprising:

an input terminal for said data filter for receiving serial-bit data from said symbol decision circuitry;

an output terminal for said data filter;

a second one-line digital delay line, having a respective input connection from said input terminal for said data filter and having a respective output connection for providing after a delay equal to the duration of a scan line of video signal a delayed response to serial-bit data from said symbol decision circuitry received at said input terminal for said data filter after a delay equal to the duration of a scan line of video signal; and a two-input exclusive-OR gate having a first input connection from said input terminal for said data filter, having a second input connection from said output connection of said second one-line digital delay line.

24. A digital signal receiver as set forth in claim 23 wherein said symbol decision circuitry is followed by a de-interleaver and then by a decoder for forward-error-correction coding.

* * * * *